(12) United States Patent
Guo

(10) Patent No.: US 9,535,912 B2
(45) Date of Patent: Jan. 3, 2017

(54) TECHNIQUES FOR CHECKING WHETHER A COMPLEX DIGITAL OBJECT CONFORMS TO A STANDARD

(75) Inventor: Dongbai Guo, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 644 days.

(21) Appl. No.: 11/532,464

(22) Filed: Sep. 15, 2006

(65) Prior Publication Data

US 2008/0071825 A1 Mar. 20, 2008

(51) Int. Cl.
*G06F 7/00* (2006.01)
*G06F 17/00* (2006.01)
*G06F 17/30* (2006.01)

(52) U.S. Cl.
CPC .............................. *G06F 17/30038* (2013.01)

(58) Field of Classification Search
CPC ... G06F 17/30038; G06Q 10/06; G06Q 10/10; G06Q 50/22
See application file for complete search history.

(56) References Cited

U.S. PATENT DOCUMENTS

| | | | |
|---|---|---|---|
| 5,671,353 A * | 9/1997 | Tian et al. ........................ 714/48 |
| 6,135,646 A * | 10/2000 | Kahn et al. .................... 709/217 |
| 6,418,475 B1 * | 7/2002 | Fuchs ............................ 709/238 |
| 6,714,979 B1 * | 3/2004 | Brandt .................. H04L 63/166 707/999.003 |
| 6,725,231 B2 * | 4/2004 | Hu ........................ G06F 19/321 707/809 |
| 7,853,621 B2 | 12/2010 | Guo |
| 2002/0035628 A1 * | 3/2002 | Gil et al. ....................... 709/224 |
| 2002/0035638 A1 * | 3/2002 | Gendron et al. .............. 709/238 |
| 2002/0143727 A1 * | 10/2002 | Hu et al. ........................... 707/1 |
| 2002/0156737 A1 * | 10/2002 | Kahn ......................... G06F 21/10 705/51 |
| 2003/0115143 A1 * | 6/2003 | Kahn et al. ...................... 705/51 |

(Continued)

FOREIGN PATENT DOCUMENTS

| | | | | | |
|---|---|---|---|---|---|
| AU | 2003204868 A1 * | 1/2004 | ......... | G06F 17/2229 |
| EP | 1376386 A2 * | 1/2004 | ......... | G06F 17/2229 |

(Continued)

OTHER PUBLICATIONS

Capturing both types and constraints in data integration, Benedikt et al (SIGMOD Jun. 9-12, 2003).*
A declarative implementation of the DICOM-3 network protocol, Kalet et al (Journal of Biomedical Informatics 36 (2003), pp. 159-176).*
DICOM SR—Integrating structured data into clinical information system, Sluis et al (MEDICAMUNDI Aug. 2002).*
Localizing Experience of digital content via structural metadata, Dushay N., JCDL, pp. 244-252, 2002.*
DICOM Application Profiler for Modelling and Checking DICOM Data-sets, Baljon et al, Computer in Cardiology, pp. 305-307, 1996.*

(Continued)

*Primary Examiner* — Augustine K Obisesan
(74) *Attorney, Agent, or Firm* — Vista IP Law Group, LLP

(57) ABSTRACT

Techniques for validating complex digital objects such as DICOM objects. The techniques employ a declarative validation document which employs a declarative constraint language to specify the constraints to which the complex digital object is subject. A validator performs an evaluation of the constraint document with regard to the complex digital object. The complex digital object is valid if all of the constraints in the validation document are satisfied. The constraint document may be compiled by an optimizing compiler and the validator may apply the resulting compiled constraint specification to an in-memory representation of the digital object which has been optimized for fast reference. An example is given of the use of the techniques with DICOM objects.

31 Claims, 20 Drawing Sheets

(56) References Cited

U.S. PATENT DOCUMENTS

| | | | |
|---|---|---|---|
| 2003/0149680 A9* | 8/2003 | Wortmann et al. | 707/1 |
| 2003/0159137 A1* | 8/2003 | Drake et al. | 717/172 |
| 2004/0064803 A1* | 4/2004 | Graves | G06F 17/30896 717/104 |
| 2004/0103169 A1* | 5/2004 | Nolte | 709/219 |
| 2004/0162809 A1* | 8/2004 | Koenig | 707/1 |
| 2004/0205563 A1* | 10/2004 | Lee | 715/513 |
| 2005/0031181 A1* | 2/2005 | Bi et al. | 382/132 |
| 2005/0055669 A1* | 3/2005 | Chawla et al. | 717/117 |
| 2005/0238255 A1* | 10/2005 | Niwa et al. | 382/305 |
| 2005/0246629 A1* | 11/2005 | Hu | G06F 17/2247 715/237 |
| 2006/0005139 A1* | 1/2006 | Comaniciu et al. | 715/760 |
| 2006/0064328 A1* | 3/2006 | Datta et al. | 705/3 |
| 2006/0085489 A1* | 4/2006 | Tomic | G06F 12/123 |
| 2006/0107056 A1* | 5/2006 | Bhatt et al. | 713/176 |
| 2006/0120584 A1* | 6/2006 | Hillman | 382/128 |
| 2006/0242159 A1* | 10/2006 | Bishop et al. | 707/10 |
| 2006/0282447 A1* | 12/2006 | Hollebeek | 707/101 |

FOREIGN PATENT DOCUMENTS

| | | | | |
|---|---|---|---|---|
| GB | WO 2005083591 A2 * | 9/2005 | | G06F 17/2247 |
| NL | WO 0231688 A2 * | 4/2002 | | G06F 17/30569 |
| WO | WO 0135310 A1 * | 5/2001 | | |
| WO | WO 0184358 A1 * | 11/2001 | | G06F 17/2247 |

OTHER PUBLICATIONS

Validating DICOM COntent in a Remote Storage Model, Mongkolwat et al, Journal of Digital Imaging, 18(1), pp. 37-41, 2005.*

General DICOM PAcs Server for Echocardiography Images, Gerritsen et al., Computers in Cardiology, 26, pp. 431-434, 1999.*

DICOM and XML usage for Multimedia Teleconsultation and for Reimbursement in Cardiology, Balogh et al, COmputers in Cardiology, 30, pp. 379-382, 2003.*

PACS through Web Compatible with DICOM Standard and WADO Service: Advantages and Implementation, Koutelakis et al., Proceedings of the 28th IEEE EMBS Annual International Conference, New York City, USA, Aug. 30-Sep. 3, 2006.*

W3C, Extensible Markup Language (XML) 1.0 (Fourth Edition), Aug. 16, 2006, 36 pages url: www.w3.org/TR/2006/REC-xml-20060816/.

W3C, "XML Schema", 25 pages, Created Apr. 2000, Revision Date: Jun. 12, 2012 url: www.w3.org/XML/Schema.

OpenClinical: Arden Syntax, "Guideline modelling methods and Technologies" http://www.openclinical.org/gmm_ardensytax.html. Sep. 13, 2006.

"The Schematron: An XML Structure Validation Language Using Patterns in Trees", Academia Sinica Computing Centre's Schematron Home Page, http://wml.ascc.net/resource/schematron/, Jun. 7, 2006.

* cited by examiner

```
                <PREDICATE>
                    <DESCRIPTION>
                        An example to find an object that has
       605          {   (patientName="Joe Smith" AND
                         patientSex=="M")
                    </DESCRIPTION>
                <LOGICAL operator="and">
                    <PREDICATE>
                        <RELATIONAL operator="eq">
                     613   <DICOM_ATTRIBUTE>00100010</DICOM_ATTRIBUTE>
                           <XML_VALUE>
                            <dt:PERSON_NAME>
                             <dt:NAME>
                              619<dt:FAMILY>Smith</dt:FAMILY>
                              621<dt:GIVEN>Joe</dt:GIVEN>
                             </dt:NAME>
                            </dt:PERSON_NAME>
                           </XML_VALUE>
                        </RELATIONAL>
                    </PREDICATE>
                    <PREDICATE>
                        <RELATIONAL operator="eq">
                     627<DICOM_ATTRIBUTE>00100040</DICOM_ATTRIBUTE>
                           <XML_VALUE>
                     629    631<dt:CODE_STRING>M</dt:CODE_STRING>
                           </XML_VALUE>
                        </RELATIONAL>
                    </PREDICATE>
                </LOGICAL>
                </PREDICATE>
```

Table 8.8-1 Common Attribute Set for Code Sequence Attributes
(Invoked as "Code Sequence Macro")

| Attribute Name | Tag | Type | Attribute Description |
|---|---|---|---|
| BASIC CODED ENTRY ATTRIBUTES | | | |
| Code Value 703 | (0008,0100) | 1C | See Section 8.1. Required if a sequence item is present. |
| Coding Scheme Designator 705 | (0008,0102) | 1C | See Section 8.2. Required if a sequence item is present. |
| Coding Scheme Version | (0008,0103) | 1C | See Section 8.2. Required if a sequence item is present and the value of Coding Scheme Designator (0008,0102) is not sufficient to identify the Code Value (0008,0100) unambiguously. |
| Code Meaning | (0008,0104) | 1C | See Section 8.3. Required if a sequence item is present. |

701

```
709  <GLOBAL_MACRO name="CodeSequenceMacro">
         <DESCRIPTION>
             Code sequence macro, PS3.3-2004, table 8.8.1
         </DESCRIPTION>
      711<PARAMETER_DECLARATION>CodeAttr</PARAMETER_DECLARATION>
         <PREDICATE>
             <DESCRIPTION>Code value must not be empty</DESCRIPTION>
             <BOOLEAN_FUNC operator="notEmpty">
    713      715 <DICOM_ATTRIBUTE>${CodeAttr}.00080100</DICOM_ATTRIBUTE>
             </BOOLEAN_FUNC>
         </PREDICATE>
         <PREDICATE>
             <DESCRIPTION>Code scheme designator must not be empty
             </DESCRIPTION>
             <BOOLEAN_FUNC operator="notEmpty">
    717      719 <DICOM_ATTRIBUTE>${CodeAttr}.00080102</DICOM_ATTRIBUTE
             </BOOLEAN_FUNC>
         </PREDICATE>
         <!-- other predicates follow -->
     </GLOBAL_MACRO>
   707
```

```
        <PREDICATE>
            <INVOKE_MACRO>
721  723     725 <MACRO_NAME> CodeSequenceMacro <MACRO_NAME>
                727 <PARAMETER> 00082228 </PARAMETER>
            </INVOKE_MACRO>
        </PREDICATE>
   720
```

Fig. 7

```
802 <GLOBAL_RULE name="ctImage"> ─── 803
   806 <PREDICATE>          ─── 804
         <LOGICAL operator="derive">
                                   ─── 808
            <PREDICATE>
               <RELATIONAL operator="eq">
               <ATTRIBUTE_TAG>00080016</ATTRIBUTE_TAG>
   807         <STRING_VALUE>1.2.840.10008.5.1.4.1.1.2</STRING_VALUE>
               </RELATIONAL>
            </PREDICATE>
                                ─── 810
            <PREDICATE>
               <LOGICAL operator="and">
                  <PREDICATE>
                     <BOOLEAN_FUNC operator="notEmpty">
        811            <ATTRIBUTE_TAG>00080008</ATTRIBUTE_TAG>
                     </BOOLEAN_FUNC>
                  </PREDICATE>
   809            <PREDICATE>
                    <RELATIONAL operator="in">
                      <ATTRIBUTE_TAG>00080008</ATTRIBUTE_TAG>
        813           <STRING_VALUE>AXIAL</STRING_VALUE>
                      <STRING_VALUE>LOCALIZER</STRING_VALUE>
                    </RELATIONAL>
                  </PREDICATE
               </LOGICAL>
            </PREDICATE>
         </LOGICAL>
   806 </PREDICATE>
   815 <PREDICATE>           ─── 821
         <LOGICAL operator="derive">
            <PREDICATE>
               <RELATIONAL operator="eq">
                  <ATTRIBUTE_TAG>00080016</ATTRIBUTE_TAG>
   823         <STRING_VALUE>1.2.840.10008.5.1.4.1.1.2</STRING_VALUE>
               </RELATIONAL>
            </PREDICATE>
                              ─── 826
            <PREDICATE>
               <LOGICAL operator="and">
                  <PREDICATE>
                     <BOOLEAN_FUNC operator="notEmpty">
        827            <ATTRIBUTE_TAG>00280002</ATTRIBUTE_TAG>
                     </BOOLEAN_FUNC>
                  </PREDICATE>
   825            <PREDICATE>
                     <RELATIONAL operator="eq">
                        <ATTRIBUTE_TAG>00280002</ATTRIBUTE_TAG>
        829            <STRING_VALUE>1</STRING_VALUE>
                     </RELATIONAL>
                  </PREDICATE>
               </LOGICAL>
            </PREDICATE>
         </LOGICAL>
   815 </PREDICATE>
   817 <PREDICATE>
         819 <GLOBAL_RULE_REF> SOPCommonModule </GLOBAL_RULE_REF>
         </PREDICATE>      Fig. 8
   801 </GLOBAL_RULE>
```

| CT Image | C.8.2.1 | M |

903

| SOP Common | C.12.1 | M |

905

| Attribute Name | Tag | Type | Attribute Description |
|---|---|---|---|
| Image Type 906 | (0008,0008) | 1 | Image identification characteristics. See C.8.2.1.1.1 for specialization. |
| Samples per Pixel 908 | (0028,0002) | 1 | Number of samples (planes) in this image. See C.8.2.1.1.2 for specialization. |

907

909 C.8.2.1.1.1 (page 361) specifies that image type must be present and have a value of either "AXIAL" or "LOCALIZER". C.8.2.1.1.2 (page 361) specify that samples per pixel for CT image must be present and equal to 1.

| Attribute Name | Tag | Type | Attribute Description |
|---|---|---|---|
| SOP Class UID | (0008,0016) | 1 | Uniquely identifies the SOP Class. See C.12.1.1.1 for further explanation. See also PS 3.4. |
| SOP Instance UID | (0008,0018) | 1 | Uniquely identifies the SOP Instance. |

Extended BNF grammar definition of DICOM constraint rules:

Format:
*Nonterminals in italics.*
XML schema data type in bold face and other terminals in regular face

*constraintRules* ::= <CONFORMANCE_CONSTRAINT_DEFINITION> *macroIncl* ruleIncl**
1003  { *globalMacro* | *globalRule*} + </CONFORMANCE_CONSTRAINT_DEFINITION>

1005 *macroIncl* ::= <EXTERNAL_MACRO_INCLUDE name="*macroName*"> *description*
        </EXTERNAL_MACRO_INCLUDE>

1005 *ruleIncl* ::= <EXTERNAL_RULE_INCLUDE name="*ruleName*"> *description*
        </EXTERNAL_RULE_INCLUDE>

*globalMacro* ::= <GLOBAL_MACRO name="*macroName*"> *macroBody*
        </GLOBAL_MACRO>

*globalRule* ::= <GLOBAL_RULE name="*ruleName*"> *predBody* </GLOBAL_RULE>

*macroBody* ::= [*desc*] *paraDecl*+ *predDef*\* *pred* + [ *action* ]

*predBody* ::= [*desc*] *predDef*\* *pred* + [ *action* ]

*predDef* ::= <PREDICATES_DEFINITION [name="*predName*"]> *predBody*
        </PREDICATES_DEFINITION>

*logical* ::= <LOGICAL name="*logicalOp*"> *pred* + </LOGICAL>

*relational* ::= <RELATIONAL name="*relationalOp*"> *paras* </RELATIONAL>

*booleanFunc* ::= <BOOLEAN_FUNC name="*booleanFuncOp*"> *paras?*
    </BOOLEAN_FUNC>

1007  *invokeMacro* ::= <INVOKE_MACRO> *macroRef macroPara* + </INVOKE_MACRO>

1009  *predRef* ::= <PREDICATE_REF> *predName* </PREDICATE_REF>

1009  *globalRuleRef* ::= <GLOBAL_RULE_REF> *ruleName* </GLOBAL_RULE_REF>

1009  *macroRef* ::= <MACRO_NAME> *macroName* </MACRO_NAME>

*macroPara* ::= <PARAMETER> *macroParaName macroParaValue*

*paras* ::= *dicomAttr* {*dicomAttr* | *xmlVal* | *stringVal* }*

1011  *action* ::= <ACTION when="xs:boolean" action="*actionType*"> *description* </ACTION>

*dicomAttr* ::= <DICOM_ATTRIBUTE> dt:VALUE_LOCATOR_MACRO_T
  </DICOM_ATTRIBUTE>

*xmlVal* ::= <XML_VALUE> dt:ANY_ATTR_T </XML_VALUE>

*stringVal* ::= <STRING_VALUE> xs:string </STRING_VALUE>

*macroParaName* ::= <NAME> xs:NCName </NAME>

*macroParaValue* ::= <VALUE> xs:string </VALUE>

*paraDecl* ::=<PARAMETER_DECLARATION> xs:NCName
  </PARAMETER_DECLARATION>

*actionType* ::= { none | log | warning | error }

*desc* ::=<DESCRIPTION> *description* </DESCRIPTION>

*description* ::= xs:string

*macroName* ::= xs:ID

*ruleName* ::= xs:ID

*predName* ::= xs:ID

*logicalOp* ::= { and | or | not | xor | derive }

*relationalOp* ::= { gt | ge | lt | le | eq | ne | in }

*booleanFuncOp* ::= xs:token

```
        <GLOBAL_RULE name="ctImage">

<PREDICATE>
                  .
                  .
                  .
           </PREDICATE>
           <PREDICATE>
              <GLOBAL_RULE_REF> SOPCommonModule </GLOBAL_RULE_REF>
           </PREDICATE>
           <ACTION action="warning" when="false">
1103          Validation warning: not a valid CT image
           </ACTION>
        </GLOBAL_RULE>

1102   (801)

<GLOBAL_RULE name="SOPCommonModule">
           <DESCRIPTION>Based on P3.3 2006 table C.12-1</DESCRIPTION>
           <PREDICATE>
                 <BOOLEAN_FUNC operator="notEmpty">
1107             <ATTRIBUTE_TAG>00080016</ATTRIBUTE_TAG>
                 </BOOLEAN_FUNC>
           </PREDICATE>
           <PREDICATE>
                <BOOLEAN_FUNC operator="notEmpty">
1109             <ATTRIBUTE_TAG>00080018</ATTRIBUTE_TAG>
                </BOOLEAN_FUNC>
           </PREDICATE>
           <ACTION action="error" when="false">
1111          Validation error: missing mandatory attribute for SOP common
              module
           </ACTION>
        </GLOBAL_RULE>

Constraint table 1207

| ID (1505) | # (1506) | ACT (1507) | Parameter1 (1509) | Parameter2 (1511) | Parameter3 (1513) | Parameter4 (1515) | onTRUE (1515) | onFALSE (1517) |
|---|---|---|---|---|---|---|---|---|
| *1* | 21 | notEmpty | 00080016 | | | | 2 | 5 |
| *2* | 22 | notEmpty | 00080018 | | | | 13 | 5 |
| *3* | 20 | AND | *2* | *1* | | | | |
| *4* | 19 | ASSIGN | *3* | | | | | |
| *5* | 23 | ERROR | *4* | false | "Validation error…" | | | |
| *6* | 10 | EQUAL | 00080016 | "1.2.840…" | | | 7 | 12 |
| *7* | 12 | notEmpty | 00080008 | | | | 8 | 15 |
| *8* | 17 | notEmpty | 00280002 | | | | 9 | 15 |
| *9* | 18 | EQUAL | 00280002 | 1 | | | 10 | 15 |
| *10* | 13 | IN | 00080008 | {"AXIAL", "LO.."} | | | 14 | 15 |
| *11* | 11 | AND | *10* | *9* | | | | |
| *12* | 9 | DERIVE | *11* | *6* | *8* | *7* | | |
| *13* | 7 | AND | *12* | *4* | | | | |
| *14* | 6 | ASSIGN | *13* | | | | | |
| *15* | 8 | WARNING | *14* | false | "Validation warning…" | | | |

Global rule table 1519

| Global rule (1523) | startOP (1525) | endOP (1527) | returnID (1529) |
|---|---|---|---|
| 1521 SOPCommonModule | 1 | 5 | 4 |
| CTImage | 1 | 15 | 14 |

Fig. 15

```
1   function evaluateConstraint(ruleName, dicomObj);
2   rule=fetchRule( ruleName);
3   operations= fetchOperations(rule.startOP, rule.endOP);
4   foreach op in operations
5       switch(op.ACT) {
6       case notEmpty:
7           pred_val := dicomObj.attrNotEmpty(op.para1);
8           break;
9       case EQUAL:
10          pred_val := dicomObj.attrEqual(op.para1, op.para2);
11          break;
12      case IN:
13          pred_val := dicomObj.attrHasValue(op.para1, op.para2);
14          break;
15      case ASSIGN:
16          pred_val:= stack.popValue(op.para1);
17          hashTable.saveValue(op.ID, pred_val);
18          break;
19      case DERIVE:
20          pred1:=stack.popValue(op.para1);
21          pred2 :=stack.popValue(op.para2);
22          pred_val := NOT(pred2) OR (pred1);
23          break;
24      case AND:
25          pred_val:=true;
26          foreach paraK of op
27              paraK_val:=stack.popValue(op.paraK)
28              pred_val := pred_val AND paraK_val;
29          break;
30      case ERROR:
31          error_cond :=hashTable.getValue(op.para1);
32          if (error_cond==op.para2)
33              system.abortWithMesg( op.para3);
34          continue;
35      case WARNING:
36          warn_cond :=stack.getValue(op.para1);
37          if (warn_cond==op.para2)
38              system.recordWarningMesg( op.para3);
39          continue;
40      case ....
41      } endSwitch;
42      stack.pushValue(op.ID, pred_val);
43  } endForeach;
44  return hashTable.getValue(rule.returnID);
```

Validator pseudocode 1701 (512)

Fig. 17

| Attribute Name | Tag | Attribute Value |
|---|---|---|
| ... | ... | ... |
| Image Type | (0008,0008) | AXIAL |
| ... | ... | ... |
| SOP Class UID | (0008,0016) | 1.2.840.10008.5.1.4.1.1.2 |
| SOP Instance UID | (0008,0018) | 12.3.13.1234324332.122.3 |
| Samples per Pixel | (0028,0002) | 2 |
| ... | ... | ... |

DICOM object metadata
table 1801 (405)

| Operation ID | predicateValue | Stack | HashTable |
|---|---|---|---|
| 1 | T | (1,T) | () |
| 2 | T | (1,T) (2,T) | () |
| 3 | T | (3,T) | () |
| 4 | T | (4,T) | (4,T) |
| 5 | NOP | (4,T) | (4,T) |
| 6 | T | (4,T) (6,T) | (4,T) |
| 7 | T | (4,T) (6,T) (7,T) | (4,T) |
| 8 | T | (4,T) (6,T) (7,T) (8,T) | (4,T) |
| 9 | F | (4,T) (6,T) (7,T) (8, T) (9,F) | (4,T) |
| 10 | T | (4,T) (6,T) .... (9,F) (10,T) | (4,T) |
| 11 | F | (4,T) (6,T) (11,F) | (4,T) |
| 12 | F | (4,T) (12,F) | (4,T) |
| 13 | F | (13,F) | (4,T) |
| 14 | F | (14,F) | (4,T) (14,F) |
| 15 | WARNING("...") | (14,F) | (4,T) (14,F) |

Trace 1811 of execution of
Validator pseudocode
1701 on object 1801

Fig. 18

… # TECHNIQUES FOR CHECKING WHETHER A COMPLEX DIGITAL OBJECT CONFORMS TO A STANDARD

CROSS-REFERENCE TO RELATED APPLICATIONS

The techniques disclosed in the present patent application are implemented in the system for integrating DICOM files into a relational database system that is disclosed in U.S. Ser. No. 11/285,977, Dongbai Guo, Integrating medical data and images in a database management system filed Nov. 23, 2005. That entire application is incorporated herein by reference.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates generally to techniques for determining whether a complex digital object that contains subobjects conforms to a standard and more specifically to techniques for determining whether a given DICOM object conforms to the general standard for all DICOM objects and also to the local standard established by a given producer or consumer of DICOM objects.

2. Description of Related Art

Complex Digital Objects

As bits have become cheaper and network communications have become quicker, many different types of complex digital objects have been developed. One large class of such objects is objects that contain data representing wave forms or still or moving images and data about the wave forms or images. The latter is termed in the following metadata. One common example of such an object is an object that contains a video. Such an object contains data representing the video images, data representing the audio signal, and metadata such as the video's title, the location of scenes in the video, closed captions, and so forth. Complex objects that contain non-character data or a mixture of character and non-character data are termed in the following binary objects.

DICOM Objects: FIG. 1

Another example of a complex digital object is a DICOM object. DICOM objects are objects that are used to record data produced by devices such as X ray or MRI machines and metadata for the recorded data. The metadata includes items such as identification information for the patient, identification information for the study the recorded data belongs to, the equipment that produced the recorded data, and the recorded data itself. DICOM objects are thus binary objects. DICOM objects are made according to the Digital Imaging and Communications in Medicine (DICOM) standard. Most modern medical imaging devices produce objects made according to the standard and the workstations and terminals used by doctors to view the objects will correctly display any object made according to the standard. The DICOM standard is revised about once a year.

FIG. 1 provides an overview of an instance of a DICOM object at 101. A DICOM object is an instance of an information object definition, or IOD, that may contain instances of other IODs. Each IOD defines a set of related pieces of information, including other IODs. A set of operations that deal with the information belonging to a given IOD are termed services for that IOD, and an IOD and its services form a service-object pair class, or SOP class. An instance of an IOD is termed an information entity, shown at 105 in FIG. 1. Information entities contain attributes as defined in the entity's IOD. Each attribute 109 specifies a single item of information. Attributes that are related to each other are grouped into information object modules, or IOMs, as shown at 107. An IOM may be specified in more than one IOD. Summing all of this up, attributes 109, which specify the rows and columns of the image, are contained in module 107, which describes the pixels making up the image information entity, which is an information entity defined by the Image IOD. The SOP class for the image IOD is the combination of the image IOD and a group of operations (service) on the attributes contained in the image information entity.

At 111 is shown in detail how an attribute's value is specified in a DICOM object 105. Each attribute is identified by a group number and an element number; here the group number 113 is hex 7FE0 and the element number is hex 0000. The group number and the attribute number together form the attribute's tag, identifying the attribute "Pixel Data Group Length", and then the value of the attribute, 19850, which in this case is the length in bytes of the value of the pixel data attribute.

Information Model for a DICOM Object: FIG. 2

FIG. 2 shows the DICOM information model, which is a conceptual description of the information that can be contained in a DICOM object and of the relationships between the components of the information. At 200 is shown how the information in a DICOM object relates to an examination of a patient in the real world. The examination is termed a study. Study 201 of patient 203 involves two different kinds of imaging. Each kind of imaging is termed a modality. In study 201 there are modality 1 203, which produced two series of images 205 and modality 2 207, which produced a single image 209. The information entities 105 resulting from study 201 are shown at information model 211. There is a single information entity 213 which represents the patient. A DICOM information model may contain more than one study 215 for a patient, as indicated at 217. The study 215 shown is for study 201 and has a set of information entities 219 for each of the series of images 205 and 209 made for the patient. The binary representations of the series of images are shown at 220(a . . . c).

At 221 is shown conceptually how the components of a DICOM object for study 201 relate to each other. Representation 221 has two components types: information entities 105 and relationships between entities 223. A relationship has a direction and a cardinality. The direction is indicated by the arrows on relationship 223, with the entity at the tail of the arrow being a first entity that the relationship relates to one or more entities at the head of the arrow. A single number on the arrow indicates an exact number of entities; x,y on the arrow indicates a range of numbers of entities. Thus, as shown at 225, 227, and 229, relationship 227 relates a single patient to one or more studies. Put another way, relationship 227 requires that there be only one patient entity in a DICOM study and that there can be more than one studies for a patient in the DICOM information model.

Continuing with representation 221, any one of the studies 229 will contain one or more series 233. As indicated at 235 and 237, a frame of reference entity may apply to none or any number of series entities 223 and an entity 239 representing a piece of equipment may create one or more of the series 233. Each series 233, finally, may contain the components shown at 245-253 in the numbers indicated by the cardinalities for the various contains relationships 243. As may be seen from the foregoing, representation 221 specifies constraints on instances of DICOM objects. An instance of a DICOM object which does not satisfy all of the constraints imposed by the information model is invalid. For example, as indicated above, one of the constraints requires that the DICOM object have one and only one patient information entity 225; if a DICOM object has none or more than one, the DICOM object is invalid. The DICOM standard further specifies constraints on the contents of information entities, manufacturers of equipment impose constraints on the attributes that describe images produced by their equipment, and producers and consumers of DICOM objects may impose further constraints. For example, a hospital may require that the attribute that identifies the physician who performed the study identify a physician who is associated with the hospital at the time the study is made. An insurance company may require that the DICOM object have been made by one of a limited number of approved vendors of medical imaging services. At present, the DICOM standard specifies the constraints in the English language. As is apparent from the foregoing, there may be different sets of constraints that apply to DICOM objects. The DICOM objects to which a given set of constraints apply are termed in the following the class of DICOM objects corresponding to the set of constraints.

These constraints must of course be validated. One known way of validating the constraints is a hard-coded validating program that writes all constraints as program constructs. The program can verify a DICOM object with respect to the set of constraints for which the program was written. Many DICOM storage system vendors provide such validating programs for free so that DICOM objects can be validated and corrected before they are stored in the system provided by the vendor. The end user of the system of course cannot maintain the code, use it with a different storage system, or alter it as required by changes in the DICOM standard or to add code for constraints particular to a new piece of equipment or to the end user. A way of validating the constraints that overcomes some of these drawbacks is to use XML. That technique will be described in the following.

XML and DICOM: FIG. 3

XML is a widely adopted format for representing any arrangement of data as a set of quoted character strings. The XML character string is termed an XML document. The W3C XML recommendation (www.w3.org/TR/2006/REC-xml-20060816/) describes the general syntax of an XML document. The W3C XML schema specification (www.w3.org XML/Schema) also describes how a user of XML may make an XML Schema document which defines how the user's particular arrangement of data is to be represented as an XML document. Anyone who has an arrangement of data and the XML schema describing how the arrangement of data is to be made into an XML document can make the XML document described by the XML schema from the arrangement of data. Another kind of document, an XSLT document, describes how an XML document may be converted into something else. One of the things an XSLT document may specify is how to convert the contents of an XML document back into the particular arrangement of data from which the XML document was made. Because XML, XML schemas, and XSLT are both canonical and completely flexible, it is becoming increasingly common to translate arrangements of data which must be shared with others to and from XML documents.

As would be expected from the foregoing, XML is used to represent DICOM objects. How one makes an XML document from a DICOM object is shown at 301 in FIG. 3. First, a DICOM parser 303 that can read the information entities which make up a DICOM object reads the attributes of entities. As the attributes are read, they are presented to an XML encoder 305, which is a program that is designed to make an XML representation 309 of DICOM object A 302 that conforms to schema 307 for XML documents made from DICOM objects. When parser 303 and encoder 305 are finished, the result is XML representation 309 of DICOM object A. The XML schema and the XML encoder can be written so that the translation from DICOM object A 302 is lossless, i.e., XML representation 309 contains all of the information that was in DICOM object A 302.

Once an XML representation of a DICOM object has been made, various operations may be performed on the XML representation instead of the DICOM object itself. One reason for doing this is that many more people are familiar with XML than are familiar with DICOM; another is that a great many tools are available for manipulating XML; for example, modern database systems include extensive XML toolkits. An example of performing an operation on an XML representation of a DICOM object instead of on the DICOM object itself is shown at 309, 313, 314, and 312 of flowchart 301. The operation is updating a DICOM object A 302 with additional information. An XML representation 309 of A exists, so the update is done on the XML representation. First, an XML representation 308 of the updates is made; it, an XSLT document for DICOM 313 and XML representation 309 are input to XSLT processor 314, which produces a new XML representation 312 that includes the contents of XML representation and updates 308 as prescribed by XSLT 313. DICOM encoder 311 losslessly produces DICOM objects from XML representations of DICOM objects. DICOM encoder 311 can consequently produce updated DICOM object A' 315 from XML representation 312. It should be noted at this point that although XML representations of DICOM objects are widely used, there is no standard XML schema for a DICOM object and consequently no standard XML representation of a DICOM object.

One of the operations that can be done on the XML representation of a DICOM object is validation of the DICOM object. This is possible because the XML representation is logically exactly equivalent to the original DICOM object. There are in general two kinds of validation that may be done on an object: structural validation and semantic validation. Structural validation validates structural constraints, i.e., constraints that are not dependent on the values of attributes in the object; semantic validation validates semantic constraints, i.e. constraints that are dependent on values of attributes in the object. To give an example of the distinction between structural and semantic validation with regard to DICOM objects, structural validation checks whether a particular DICOM object obeys the structural constraint that there may be only one patient node 225 in a DICOM object; semantic validation of a particular patient node 225 checks whether the information in the patient node obeys the semantic constraint that the patient's name must exist and is not empty for DICOM objects that are produced by a study that was performed after a certain date.

Validation of an XML representation of a DICOM object may be done by incorporating checks for DICOM constraints in the XML representation's XML schema and by combining XSLT with XPath statements that check for DICOM constraints. XPath is a standard language for locating nodes in an XML document and returning information about them. This is shown at 317. Both structural and semantic validation may be done. Structural validation is done as shown at 319. An XML document 309 to be validated and the XML schema 307 for the document are input to a schema validator 321 which produces validation result indicating whether the XML document has the structure described by the documents XML schema. Semantic validation is done as shown at 325. The XML representation 309 to be validated is input to XML decoder 309 along with DICOM validation XSLT 327. Validation XSLT 327 contains XPath statements which check the semantic constraints and return results. Validation XSLT 327 produces validation result 329 which specifies any semantic constraint results. In terms of what XSLT generally does, XML document 309 has been transformed into validation result 329.

The use of the XML schema and XSLT and XPath to validate XML documents is explained in detail in William L. Provost, *An XML Validation Architecture using XML Schema, XPath, and XSLT*, available in August, 2006 at www.objectinnovations.com/Library/Articles/Provost/XML ValidationArchitecture/index.html.

The reference is copyrighted 2004. As may be seen from the Provost reference, neither the XML schema, XSLT, nor XPath was designed to do validation, and consequently, a high order of skill in XML is required to use the XML schema, XSLT, and XPath for that purpose. A related problem is that the validation is done in terms of the structure and content of the XML document, not in terms of the structure and content of the DICOM object. A consequence of this is that expertise in the structure and semantics of the DICOM object is not by itself sufficient to do validation of DICOM objects using the XML schema, XSLT, and XPath. What is required to do it is enough expertise both in DICOM and in XML to be able to translate the constraints as expressed in English in the DICOM standard into an XML schema, a set of XPath statements that check those constraints, and an XSLT document that produces the validation result.

A System that Uses XML to Represent DICOM Objects and Uses the XML Representations to Validate the DICOM Objects: FIG. 4

FIG. 4 is a block diagram of the system for integrating DICOM objects into a database management system described in U.S. Ser. No. 11/285,977. In that system, validation is done on the XML representations of the DICOM objects. The main components of system 401 are in-memory DICOM representation 405 in memory 403, model 409 in repository 407, relational database system 423, and programs including DICOM encoder 416, DICOM parser 417, an XML encoder 419, an XML parser 420, and a DICOM conformance validator 421. Beginning with in-memory DICOM representation 405, the representation is a representation of a DICOM object that has been optimized to permit rapid access to the DICOM object's subobjects. In system 401, in-memory DICOM representation 405 represents the DICOM object as a hierarchical directed graph. The components of the DICOM object are nodes in the directed graph. Pointers in the nodes permit rapid traversal of the graph. Because the graph is hierarchical, no node of the graph has more than one parent. DICOM parser 417 provides the interface which is used by other components of system 401 to perform operations on in-memory DICOM representation 405. Among operations that DICOM parser 417 can perform is returning a value indicating a data type for a given locator for a subobject of the DICOM object and also returning subobject values of the data type contained in a DICOM object.

Model repository 407 is persistent storage that contains a model 409 of DICOM objects. Model 409 is modifiable by the user of system 401 and may thus be easily changed to deal with changes in the DICOM standard and with peculiarities of DICOM objects that are either produced locally or received from elsewhere. Model 409 has three components:

DICOM data dictionary 411 describes for each information entity, attribute, and module in the classes of DICOM objects that system 401 deals with how the entity, attribute, or module is to be represented in in-memory representation 405.

DICOM mapping document 413 is an XML document that describes how an XML representation of a DICOM object is to be made from the DICOM object's in-memory representation 405.

XML validation documents 415 are XSLT and XPath documents that are used to validate the XML representation of a DICOM object in the manner already described. The validation documents in repository 407 must be able to validate every class of DICOM object that system 401 deals with.

Relational database system 423 contains at least one relational table 425 which has rows 427 that contain SQL-DICOM objects. An SQLDICOM object has two components that are of interest in the present context: an XML representation 429 of the DICOM object's metadata, i.e., of all of the data in the DICOM object other than the images themselves, and a binary copy 431 of the DICOM object itself.

Operation of system 401 is as follows: When a DICOM object 105 is received in system 401, it is copied to field 431 of a row in relational table 425. DICOM parser 417 further reads DICOM object 105 either directly or from field 431, retrieves the information entities, modules, and attributes from the DICOM object, and produces in-memory DICOM representation 405 of the entities, modules, and attributes as specified by the attributes in DICOM data dictionary 411 for the entities, modules, and attributes. When in-memory DICOM representation 405 is finished, XML encoder 419 makes XML metadata 429 by reading in-memory DICOM representation 405 and making it into an XML document as specified in mapping document 413. XML metadata 429 is then stored in the row 427 that contains the DICOM object. XML parser 420 can now use XML metadata 429 and DICOM data dictionary 411 to make in-memory DICOM representation 405 from the XML metadata. DICOM performance validator 421 then validates the DICOM object by using the XML schema or the XSLT document and the XPath document on XML metadata 429 for the DICOM object and produces a validation result 329 as described in the discussion of FIG. 3. It should be noted here that no mechanism is provided in system 401 for validating a DICOM object beyond that offered by using XSLT and XPath to validate the XML object made from the DICOM object. That mechanism suffers from the shortcomings described with reference to the validation techniques shown at 317 in FIG. 3. It is an object of the techniques described herein to overcome those shortcomings and provide improved validation of binary objects and other complex digital objects.

BRIEF SUMMARY OF THE INVENTION

The object of the invention is attained by validation apparatus that permits the use of a declarative validation specification to validate a digital object with identifiable subobjects. The apparatus is implemented in a processor and data storage accessible to the processor and includes a representation of the digital object in the data storage, a declarative validation specification in the data storage, and an executable validator in the data storage. The declarative validation specification specifies one or more constraints that the digital object is subject to. When the executable validator is executed by the processor, it performs an evaluation of the validation specification with regard to the representation of the digital object. The digital object is valid when the evaluation indicates that all of the constraints in the validation specification are satisfied.

In further aspect, the validation specification is written in a declarative constraint language. In the constraint language, a constraint may be defined in terms of other constraints and a specification of a constraint in the constraint language includes specifications of the other constraints. The value to which the constraint evaluates is determined at least in part by the values to which the other constraints evaluate. The constraints evaluate to TRUE or FALSE and the other constraints are operands of a Boolean operation whose evaluation determines the value of the constraint.

The language permits specifications of constraints to be parameterized and to be named and constraints may be referred to by name in the validation specification. A specification of a constraint may further specify an action whose performance depends on a result of the evaluation of the constraint. Actions include terminating the evaluation and providing an intermediate result of the evaluation.

The validation apparatus may further include an executable compiler in the data storage. When executed by the processor, the compiler produces a compiled validation specification. The validator uses the compiled validation specification to perform the evaluation. The compiler optimizes the compiled validation specification with regard to the cost of evaluating the constraints. The validation apparatus may further include a data dictionary for the object that provides the compiler with a cost of applying the constraint to the digital object and the compiler uses this cost to optimize the compiled validation specification.

The validation apparatus may further include an optimized representation of the digital object that provides rapid access to the digital objects subobjects. The validator performs the evaluation using the compiled validation specification and the optimized representation. The optimized representation may be stored in memory local to the processor.

The data storage further includes a database system in which the digital object is stored. The data dictionary, the declarative validation specification, and the compiled representation of the validation specification belong to a model for a class of the digital objects stored in the database system.

A validation apparatus embodying principles of the invention may also be made which does not require a declarative validation specification, but instead compiles the validation specification to produce a compiled validation specification which the validator uses to validate a representation of the digital object. The compiler may be an optimizing compiler and the validation apparatus may also include an optimized representation of the digital object.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 6 is an example of a predicate written in the constraint language used in the validation documents of the system of FIG. 5;

FIG. 7 shows a constraint definition from the DICOM standard and a macro written in the constraint language that checks for violation of the constraints in the constraint definition;

FIG. 8 shows a rule written in the constraint language;

FIG. 9 shows the constraint definitions from the DICOM standard that the rule of FIG. 8 implements;

FIGS. 10A-10C show an extended BNF grammar definition of the constraint language used in a presently preferred embodiment of the validation documents;

FIG. 11 shows the constraint language for an example rule that will be used in the discussion of compilation and execution;

FIG. 15 shows the constraint table which compiler 511 makes from the tree of FIG. 14;

FIG. 17 is pseudocode for an implementation of validator 512; and

FIG. 18 shows a representation of DICOM object metadata and a trace of the execution of a rule that applies to the metadata by validator 512.

DETAILED DESCRIPTION OF THE INVENTION

The following Detailed Description first presents an overview of validation of a DICOM object by applying a declarative validation document to an in-memory representation of the DICOM object. The validation document specifies the constraints that are relevant to the DICOM object in a declarative constraint language that directly describes the DICOM object's constraints. The term declarative here and in the following means that the entity being termed declarative describes what is to be done, rather than how to do it. Thus, the validation document describes what is to be validated in the DICOM object rather than how to do the validation and the constraint language describes the constraints that must be satisfied rather than how to find out whether they have been satisfied. The validation document further describes the constraints in terms of the DICOM object, rather than in terms of an XML document made from the DICOM object. The overview is exemplary for the validation of complex digital objects generally and binary objects in particular. The Detailed Description then presents details of DICOM constraints, of their expression in the constraint language used in the validation document, of the compiled representation of the validation document, and of validation of the in-memory DICOM representation using the compiled representation of the validation document.

Overview of Using Validation Documents to Validate Complex Data Objects

Using a Validation Document for DICOM Validation in System 401

Figure 1:
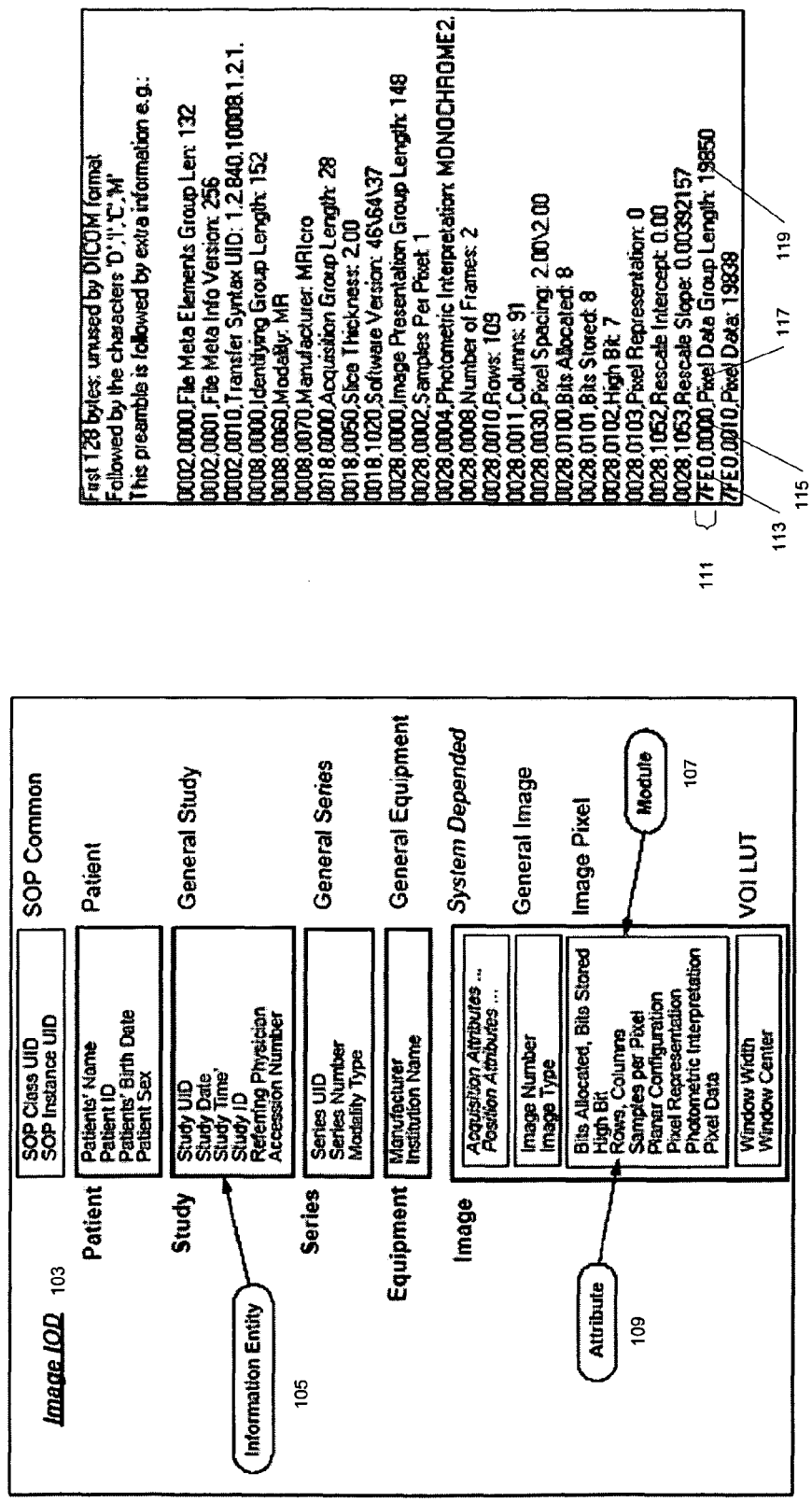
FIG. 1 is an overview of a DICOM object.
Figure 2:
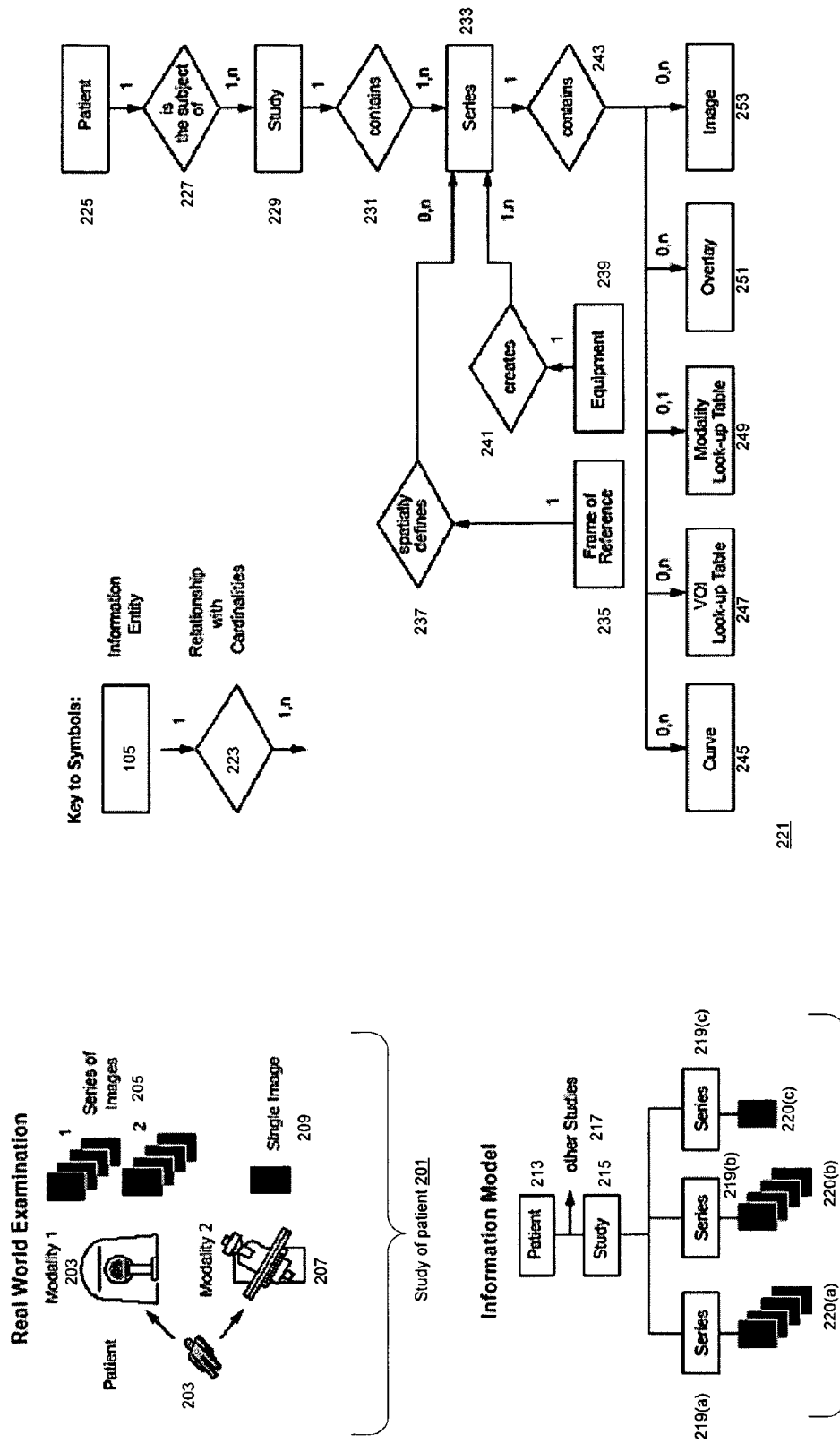
FIG. 2 shows the information model for a DICOM object.
Figure 3:
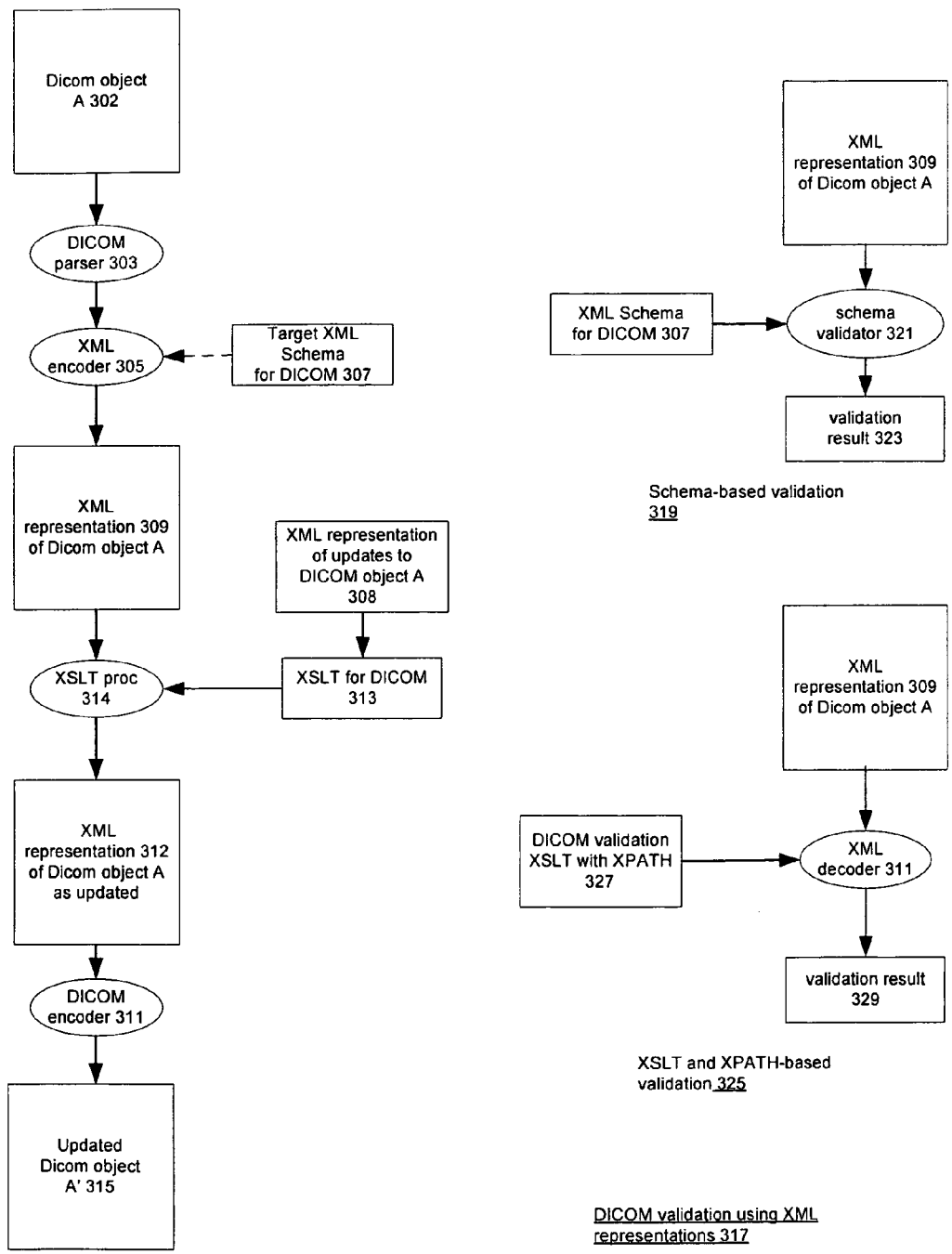
FIG. 3 shows how a DICOM object may be made into an XML object and how the XML object may be used to validate the DICOM object.
Figure 4:
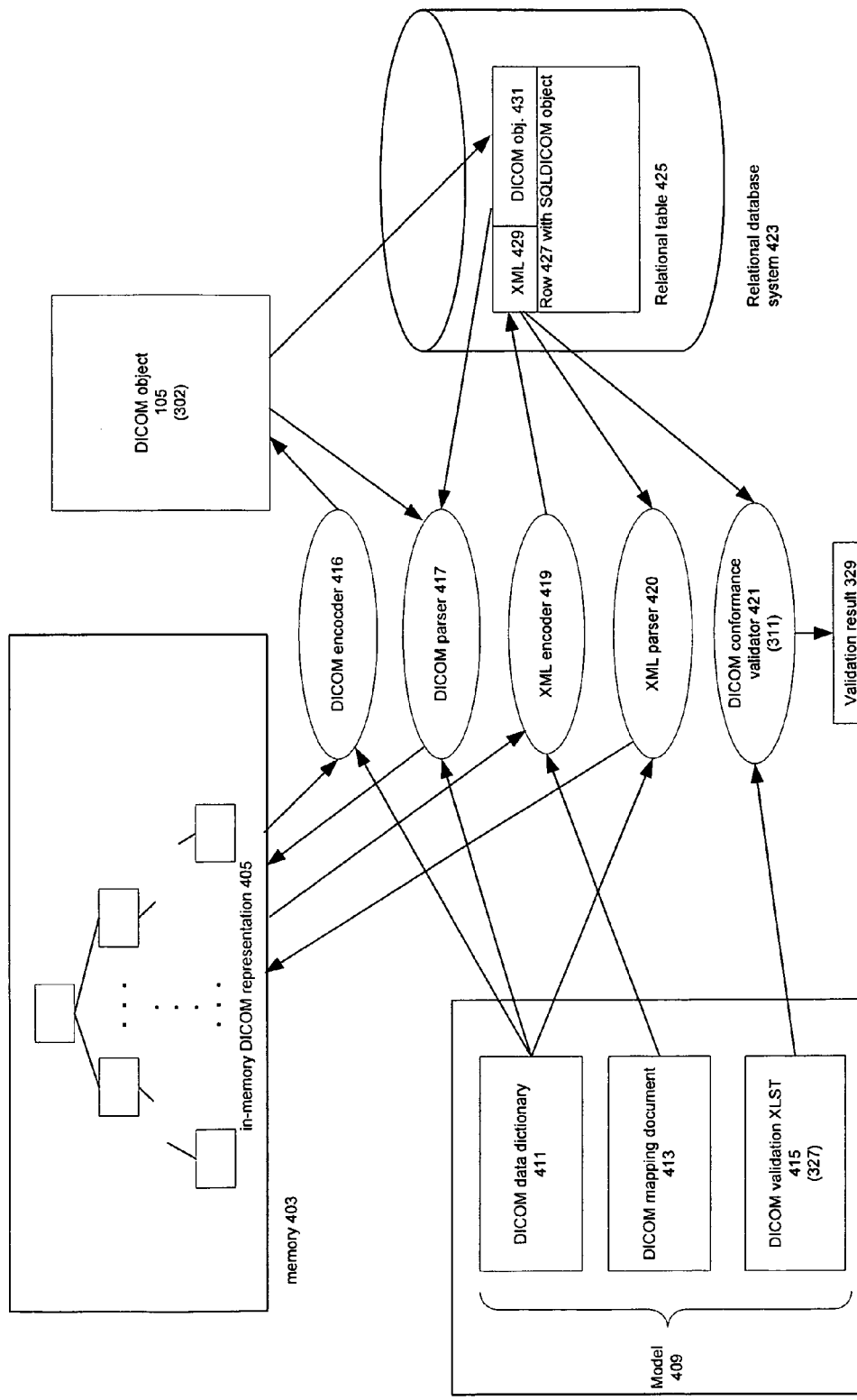
FIG. 4 shows the system for incorporating DICOM objects into a relational database system disclosed in U.S. Ser. No. 11/285,977.
Figure 5:
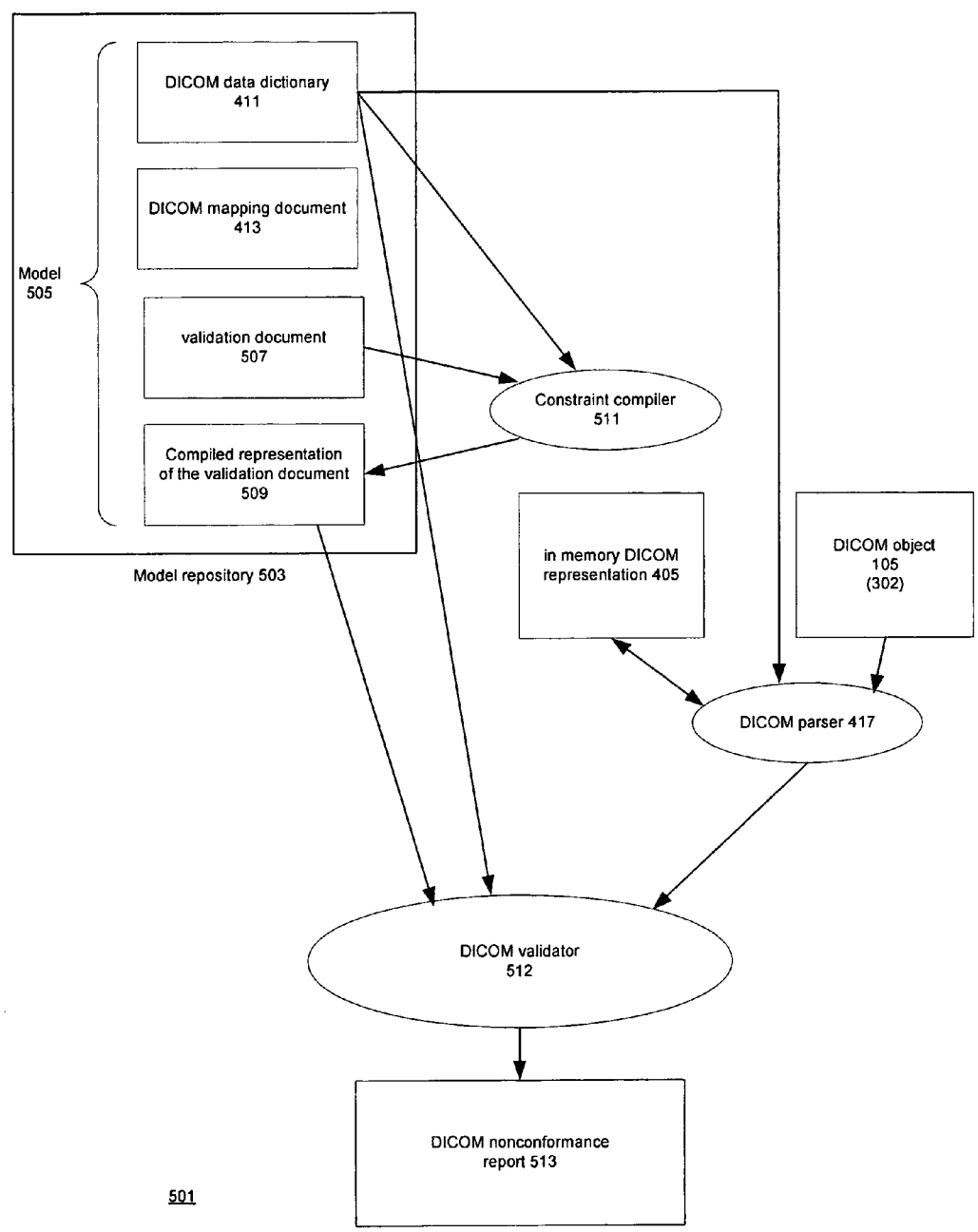
FIG. 5 is an overview of how a validation document may be used in the system of FIG. 4 to validate a DICOM object.

FIG. 5 shows at 501 the relevant portions of system 401 as modified to validate the in-memory representation of a DICOM object using a validation document that directly expresses the DICOM objects constraints, rather than validating an XML representation of the DICOM object in which the constraints are expressed using XML Schema, XSLT, and XPath. Beginning with model repository 503, in model repository 503, DICOM verification XSLT 415 has been replaced by validation documents 507 and compiled representations of validation documents 509. As before, there must be validation documents in repository 503 that can be used to check each class of DICOM objects that system 501 must deal with. Validation document 507 is a document that directly specifies the constraints to which a given class of DICOM objects must perform. Validation document 507 is compiled by constraint compiler 511 to produce compiled representation 509 of validation document 507. Compiler 511 uses data dictionary 411 to check for syntax errors such as mismatching data types in the validation document 507. The purpose of compilation is to put the constraints into a form in which it can be efficiently determined whether the in-memory representation of DICOM object 405 conforms to the constraints. In a preferred embodiment, validation document 507 is an XML document, but the use of XML is not required. and validation document 507 may have any form which can be interpreted by compiler 511. DICOM validator 512 can interpret compiled representation 509 and uses compiled representation 509 to determine whether in memory DICOM representation 405 satisfies the constraints specified in validation document 507.

In system 501, the validation process for a DICOM object that is contained in the system is the following: if the DICOM object belongs to a class of DICOM objects for which there is already a validation document 507 and a compiled representation of the current version of validation document 509 in model repository 503, the user has system 501 use DICOM parser 417 to produce an in-memory representation 405 of the DICOM object and has DICOM validator 512 use the compiled representation 509 of the validation document for the DICOM objects class to validate the in-memory representation 405 of the DICOM object and produce DICOM nonconformance report 513. Validator 512 employs DICOM data dictionary 411 to obtain information about subobjects in the DICOM document and employs DICOM parser 417 to locate nodes of in-memory representation 405 corresponding to the subobjects and to retrieve attribute values from the nodes.

If model repository 503 has a validation document 507 for the class of DICOM objects but compiled representation 509 is not current with the validation document 507, the user must again compile validation document 507 to produce a compiled representation 509 that is current with the validation document before the DICOM validator can validate the DICOM object. If model repository 503 does not have a validation document 507 for the class, the user must make a validation document 507 for the class and compile the validation document. What this will generally involve is copying the validation document 507 that is closest to the one needed for the class and modifying the copy by adding and/or deleting a small number of constraints. An original validation document 507 would typically be provided to the user by the manufacturer of system 501 or of constraint compiler 511; that document would contain the constraints required by the DICOM standard when it was provided; the user would then make a copy of the original to which the user would add whatever local constraints were required. The user would also update the validation document whenever constraints were added to the DICOM standard. Of course, the manufacturer could also provide an updated original validation document whenever the DICOM standard changed. Indeed, in an ideal world, the DICOM standard would use a validation document 507 to specify DICOM constraints, and users of system 501 could upgrade by simply incorporating the latest standard validation document into model repository 503.

Validation using validation document 507 and constraint compiler 511 has major advantages over validation as done with XSLT and XPath in system 401. The advantages include the following:

Simple and Direct Expression of the Constraints

The language used in validation document 507 permits simple and direct expression of the constraints in terms that relate directly to the DICOM constraints rather than to representations of the DICOM constraints in terms of particular technologies such as XML that are used to represent the DICOM object model. In validation as done with XSLT and XPath, by contrast, such direct expression is not possible. Two levels of indirection are required. First, constraints must be expressed in terms of the XML representation, not the DICOM object itself; second, as mentioned above, neither the XML schema nor XSLT and XPath are designed for validation; consequently the writer of the XML schema, the XSLT document, and the XPath it employs cannot directly express the constraints in those documents, but must instead use constructs that were created for other purposes to specify the constraints. There are two disadvantages that flow from this: first, a very high level of skill with XML is required to both write and understand the XML documents that are used in constraint checking; second, the need to use constructs in unusual ways to specify constraints necessarily makes it hard to understand what constraints of the DICOM object are being checked. In many cases, the user of system 401 who is responsible for maintaining model 409 will simply not have the XML skills required to understand and maintain the repository's XML validation XSLTs 415.

Speed of Validation

Validation done on in memory DICOM representation 405 using compiled constraint representation 509 is far faster than validation done on the XML representation of a DICOM object using the XML schema and XSLT with XPath. Because in memory DICOM representation 405 of the DICOM object has been optimized for rapid access to the DICOM object's sub objects and is in memory, the nodes of representation 405 are all simultaneously available and can be accessed far more quickly than if the DICOM representation were in a file.

Optimization of Validation

Because DICOM validator 512 uses compiled representation 509, constraint compiler 511 can perform optimization both on the basis of the relationships between the constraints themselves and on the basis of properties of in memory DICOM representation 405.

Technological Neutrality

The validation document is technology neutral. Constraint validation using the validation document may be done with our without XML.

Ease of Use

Features of a preferred embodiment of the validation document such as named components and references to external named components make it easier to build a large scale validation package that has many reusable parts and that can be easily kept synchronized with the DICOM standard. The modules and macros can be easily shared, customized and combined into complex constraints.

Disadvantages of Validation Using XML Include:
XML Schema Validation is Tied to a Particular Version of the DICOM Standard The DICOM standard is constantly being updated with corrections and revisions. An XML schema based validation approach is necessarily tied to a particular version of the DICOM standard. Further, in a system such as system 401, the XML metadata 429 for a the DICOM object belonging to a particular row 427 in table 425 must be related to the XML schema used to validate it. The requirement that the XML schema be tied to the metadata 429 it is to validate makes it very difficult to migrate the contents of relational table 425 to reflect changes in the DICOM standard that result in changes in the XML schema.

The XML Schema Used to Validate XML 429 May Differ from the XML Schema Used to Make XML 429.

The XML schema used to make XML 429 for a DICOM object may be different from that used to validate the object. For example, we may want to store a DICOM object even though it is invalid and in that case the XML schema used to make XML 429 must be retained. Keeping two XML schemas, one for storage and one for validation, is possible but increases the complexity of row 427 and of managing its contents.

The Computational and Storage Overhead Required for XML

When XML is used to represent large binary data, the result is added computational and storage overhead. An XSLT and XPath based validation approach requires the presence of XML data about the XML object that may not be associated with the DICOM object. When this is the case the XML data required for validation can be obtained only by converting the entire DICOM object into XML.

Lack of Portability and Scalability

There is no widely accepted storage model for the XML representation of a DICOM object; consequently, validation using XSLT and XPath is almost never portable to a different environment. The scalability of validation using XSLT and XPath is also questionable.

The particular implementation of using a validation document to validate a DICOM representation shown at 501 is of course determined to some extent by the nature of system 401. In system 401, a DICOM object 105 that is being operated on is always translated into its in-memory representation 405; as a result, DICOM parser 417 is available to perform the translation; further, the existence of model repository 503 and the need to maintain it results in the separation of compilation of validation document 507 from validation of the DICOM object.

In other embodiments, DICOM validator 512 may contain a component which translates the DICOM object to be validated into in memory representation 405 and may further include compiler 511. In such an embodiment of validator 512, the user would specify the validation document to be used in validation and the DICOM object to be validated and the validator would compile the validation document, translate the DICOM object into its in memory representation, and use the compiled representation of the validation document to validate the in memory representation. Of course, versions of the validator could be built which did compilation or translation of the DICOM object to an in memory object but not both. Finally, a far slower version of the validator could be built which directly interpreted validation document 507 and validated an in memory representation of the DICOM object or even the DICOM object as stored in a file. Validation done in this manner would be no faster than validation done using an XML schema and XSLT with XPath, but would be far easier for a user to implement and understand.

Using Validation Documents To Validate Complex Data Objects Generally

Validation using constraint objects as described above for DICOM objects can be done with complex data objects generally. As will be apparent in the following, the constraint language used to express constraints in validation document 507 is general and can be used to describe constraints in any kind of complex data object. An in memory representation can of course be made for any kind of complex data object; in most cases such a representation will be a hierarchy like the hierarchies used to represent DICOM objects. In any case, however, the constraint compiler can be implemented to optimize the compiled representation of the validation document to take advantage of properties of the constraints in the validation document and of the in memory representation of the complex data object.

Details of DICOM Validation Using Validation Documents

Overall Form of a Validation Document 507

In a preferred embodiment, a validation document 507 is a list of one or more rules and/or macros. A macro is a parameterized rule. Each rule or macro contains a list of one or more predicates; each predicate specifies a constraint that may apply to a DICOM object. When validator 512 applies the predicate to a DICOM object, the result is the Boolean value TRUE if the constraint is satisfied and FALSE if it is not. A predicate may contain a reference to a rule or a macro and may have further predicates nested in it. When all of the constraints in a rule or macro have the result TRUE, the rule or macro has the result true; when all of the rules or macros in the validation document have the result TRUE, validator 512 indicates that the DICOM object is valid; otherwise, it indicates that the DICOM object is not valid.

Detailed Example of a Predicate: FIG. 6

Predicate 601 in FIG. 6 checks the semantic constraint that a particular patient's name be "Joe Smith" and that the patient's sex be male. The name and sex are both tagged attributes in the DICOM object, with the name having the tag 00100010 and the sex having the tag 00100040. The constraint can be specified using Boolean logic like this:

((0010010=Joe Smith) AND (00100040=M))

In a preferred embodiment of the validation document, predicates employ reverse Polish notation. When expressed in reverse Polish notation, the constraint looks like this:

AND(=((0010010) (Joe Smith))(=((00100010) (M))))

The validation document is written in XML; consequently, every element of the predicate must begin with an XML tag of the form <element_name> and end with a tag of the form </element_name>. Elements may be nested in other elements. The above constraint is expressed as a PREDICATE element 603 that contains a DESCRIPTION element 605 describing the constraint in human readable form and a LOGICAL operator element 607 specifying an and operation. The LOGICAL operator element in turn contains two PREDICATE elements 609 and 623, each of which contains a RELATIONAL operator element 611 and 625 specifying an equals operation, a DICOM_ATTRIBUTE 613 and 627 specifying a tag in the DICOM object, and XML_VALUE elements 614 and 629 indicating that the following values 617, 619, 621, and 631 are values expressed in XML for the fields specified by the DICOM tags at 613 and 627. It should be pointed out here that validation document 509, like all XML documents, is designed to be written and read by machines, instead of human beings. Human beings who are writing a validation document 509 employ a user interface which requires the user only to specify the constraint, not the XML for the document. Indeed, in some embodiments, a graphical user interface may be used to specify constraints.

Rules: FIGS. 8-9

FIG. 8 shows an example rule 801. FIG. 9 shows the DICOM constraints 901 that the rule checks as the constraints are expressed in the DICOM standard. The tables shown at 901 are taken from the DICOM standard. Each row of the table gives the name of an attribute, its tag, its type, a pointer to the description of the attribute, and a statement of the circumstances under which the attribute is required. The statement of those circumstances is of course a statement of a constraint. The first constraint, a semantic constraint shown at 903, states that a CT image module is required in a DICOM object that is a computer tomography (CT) image IOD. The second constraint, at 905, states that an SOP common module is required in this IOD. Part of the definition of the CT image module is shown at 907 and explained at 909. Every CT image module has a value that specifies an image type and a value that specifies the number of samples per pixel. The image type value is identified by the tag 00080008 and the value must be either AXIAL or LOCALIZER (constraints 906, 909). The samples per pixel value is identified by the tag 00280002 and must have the value 1 (constraint 908). The definition of the SOP common module is shown at 911. The SOP common module must contain a unique identifier that uniquely identifies the class the SOP belongs to and a unique identifier that identifies the SOP's instance. The tag for the class UID is 00080016 and that for the instance UID is 00080018. All of these constraints are structural constraints.

In a preferred embodiment, a rule is a list of predicates that has a global name, i.e., the name is visible to every validation document in model repository 503. The name of rule 801 is ctImage, as shown at 803; that the rule name is global is stated at 802. At the top level, rule 801 contains three predicates: the predicate whose beginning and end are indicated by the reference number 806, the predicate whose beginning and end are indicated by the reference number 815, and the predicate indicated by bracket 817. Predicates 806 and 815 have several levels of nested predicates; predicate 817 contains a reference 819 to another global rule, SOPCommonModule, which checks constraints 903. When validator 512 executes rule 801, it also executes the rule referenced at 819. Rule 801 will evaluate to TRUE only if constraint 806, constraint 815, and constraint 817 all evaluate to TRUE.

Continuing with predicate 806, the predicate checks for constraints 903, i.e., whether the DICOM object is a CT image (predicate 807) and if it is a CT image, whether it satisfies the CT image module constraint 903, which in turn is satisfied if constraints 906, 908, and 909 are satisfied (predicate 809). When predicate 806 is applied to the DICOM object, predicate 806's value is the result of a derive logical operation 804 on the two immediately nested predicates predicate 807 and 809. The derive logical operator is identical to the Boolean implies operator. Like implies, A derive B returns TRUE when A is FALSE, or TRUE when A is TRUE and B is TRUE, and FALSE only when A is TRUE and P is FALSE.

Predicate 807 tests whether a DICOM object is a CT image by looking for a tag 00080016 that identifies an SOP class UID and then testing whether the string value associated with the tag indicates that the object is a CT image. If there is no SOP class UID for a CT image, the DICOM object is not a CT image, predicate 807 returns FALSE and the derive operator returns TRUE as the value of predicate 806. In this case, TRUE means that the DICOM object is not a CT image and therefore is not subject to the rules of a CT image module (predicate 809). If there is an SOP class UID for a CT image, predicate 807 returns TRUE. In this case, the constraints for the CT image module apply and predicate 806 is true only if predicate 809 also returns TRUE, i.e., only if there is an attribute with the tag 00080008 (predicate 811) AND the attribute value for the tag 0000800008 is either AXIAL or LOCALIZER (predicate 813). The in relational operator returns TRUE if a value specified as an operand of the in operator is a member of a set of values specified as an operand. Predicate 815 works the same way as predicate 806, except that it checks for samples per pixel constraint 908.

Naming Components of the Validation Document and Referring to Named Components

A given rule, macro, or predicate may be used over and over again in the course of verifying a particular DICOM document. To make writing constraints and rules simpler and to make the validation document easier to understand, the constraint language used in the validation document requires that rules and macros be named and also permits predicates to be named. The constraint language also includes referral constructs that refer to a predicate, rule, or macro by its name. When compiler 511 encounters such a referral construct, it replaces the construct with the predicate, rule, or macro that is specified by the name in the referral construct. There are two kinds of names: local names, which are visible only within the scope (i.e. predicate) where they are defined, and global names, which are visible to every validation document in model repository 503. In a preferred embodiment, predicate names are local to the validation document 507; macro names and rule names are global names. Compiler 511 maintains a list of global names and pathnames to the entities the names represent in model 505.

Macros: FIG. 7

Many of the constructs used in DICOM objects are used repeatedly, but each time in a different context. To deal with this situation, the constraint language used in the validation document permits the user to define macros. A macro is a named sequence of elements of the constraint language which takes one or more parameters. The language includes an invokeMacro construct which indicates that the macro named in invokeMacro is to be executed with the values specified in invokeMacro for the macro's parameters.

One place where macros are useful is with code sequence attributes. A code sequence attribute represents a set of codes which may be used to describe an entity in the DICOM object. An example of such a set of codes is the set of diagnostic codes used by insurance companies to indicate various medical conditions. As shown in constraint 701 from the DICOM standard, if an entity has a code sequence attribute, the code sequence attribute must have further attributes that define the set of codes that the code sequence attribute specifies. In terms of the tree structure of the DICOM object, the node for the code sequence attribute must have child nodes for the further attributes required to define the set of codes. Thus, given the value of a code sequence attribute as a parameter, DICOM validator 512 can execute a macro to find out whether the code sequence attribute has the required further attributes. Again, constraint 701 is a structural constraint.

FIG. 7 also shows at 707 a portion of a macro that checks whether a code sequence attribute that is provided as a parameter has all of the attributes that must belong to the code sequence attribute. The macro construct at 709 specifies the macro's name, CodeSequenceMacro. The parameter for the macro is specified at 711. Two predicates are shown in the macro. Each of them contains a Boolean function 713, 715 that checks whether the code sequence attribute that is passed in as a parameter has an element with the tag required for one of the attributes that must belong to the code sequence attribute. As can be seen from the tags used as arguments in the Boolean functions, Boolean function 713 checks at 715 for the presence of the attribute specified at 703 in table 701, while Boolean function 717 checks at 719 for the presence of the attribute specified at 705 in table 701.

At 720 is shown a predicate 721 which contains a macro invocation 723 for CodeSequenceMacro. Macro invocation 723 includes a specification of the name of the macro at 725 and a specification of the parameter used in the invocation at 727. In this case, the parameter is the tag for a code sequence attribute. When macro 707 is invoked in a predicate, the effect is the same as if the predicate with the invocation had been written with all of the macro's predicates as evaluated for the value of the parameter specified in the macro invocation.

The macros of the constraint language may be recursive (invoke themselves). A recursive macro may have infinite depth. There are two ways of dealing with this: limiting the depth of recursion or interpreting the macro at run time instead of expanding it at compile time. The former approach converts the recursive macro into a regular fixed depth macro and one can always makes it work for a large depth DICOM object by giving it a larger depth limit, so the preferred embodiment employs this approach in the preferred embodiment.

Including Previously-Defined Rules and Macros in a Validation Document

To further simplify the process of writing validation documents, the constraint language has include statements that permit the writer of a validation document to specify inclusion of rules and macros that are defined in other validation documents in repository 503. For example, an include statement that includes the macro CodeSequenceMacro in another validation document looks like this:

<EXTERNAL_MACRO_INCLUDE name = "CodeSequenceMacro">
</EXTERNAL_MACRO_INCLUDE>

The ability to include macros and rules that are defined in other validation documents is particularly valuable in dealing with DICOM constraints because most of the constraints are defined by the standard and the constraints defined for a particular piece of imaging equipment or for a particular institution are added to the constraints defined by the standard. If there is a validation document for a global rule that embodies the current standard, a validation document for a global rule that embodies the constraints defined for a particular piece of imaging equipment, and a validation document for a global rule that embodies the constraints for a particular institution, the validation document for DICOM objects produced by a particular piece of imaging equipment in a particular institution can be written by including the global rule for the standard, the global rule for the equipment, and the global rule for the institution. Ideally, of course, the global rule for the standard would be provided by the DICOM standards group, the global rule for the equipment would be provided by the equipment manufacturer, and a particular institution would have only to write the global rule for its own constraints.

The BNF Grammar Definition for the Constraint Language

FIGS. 10A-10C provide the complete BNF grammar definition of a presently-preferred embodiment 1001 of the constraint language. Constraint languages having many other grammars are of course possible. BNF grammar definitions are a well-known technique for defining programming languages. The smallest compilable unit of the constraint language is defined at 1003 of FIG. 10A; it is a macro or a rule. Inclusion constructs are shown at 1005 of FIG. 10A, the macro invocation construct at 1007 of FIG. 10B, and referral constructs for named predicates, rules, and macros at 1009 of FIG. 10B. At 1011 is shown an action construct. The action construct is an optional component of macros and predicates and is used to bring about an action when a particular macro or predicate is evaluated. As indicated in the BNF of actionType in FIG. 10C, the action may be nothing, an output to a log, a warning message in nonconformance report 513, or an error message in nonconformance report 513. When an error is specified in an action construct, validator 512 outputs the error message and terminates the validation of the DICOM object. A possible action construct for the rule ctImage 801 is the following:

<ACTION action="warning" when="false">Validation warning: not a valid CT image</ACTION>

This outputs a warning to nonconformance report 513 when rule 801 evaluates to FALSE. The action construct immediately precedes the end of the construct to which it applies, thus, in the case of rule 801, it immediately precedes the </GLOBAL_RULE> for the rule.

Compilation of a Validation Document

In the following discussion of the compilation and execution of a validation document, we will use as an example a validation document 1101 which is a slightly modified version of ctImage rule 801 and another rule, SOPCommonModule, which is referred to at 809 in rule 801. The example rules are shown in FIG. 11. Beginning with version 1102 of the ctImage rule, the difference between version 1102 and version 801 is that version 1102 includes action 1103, which produces a warning when the DICOM object to which the rule is being applied does not include a CT image. SOPCommonModule is shown at 1105. It checks constraints 905 and 911, which require that an SOP common module be present in a DICOM object and that it have a class UID and an instance UID. Predicate 1107 checks whether a DICOM object has a tag for a class UID and predicate 1109 checks whether the DICOM object has a tag for an instance UID; if either of these tags is not present, action 1111 produces an error message and terminates the validation of the DICOM object.

Figure 12:
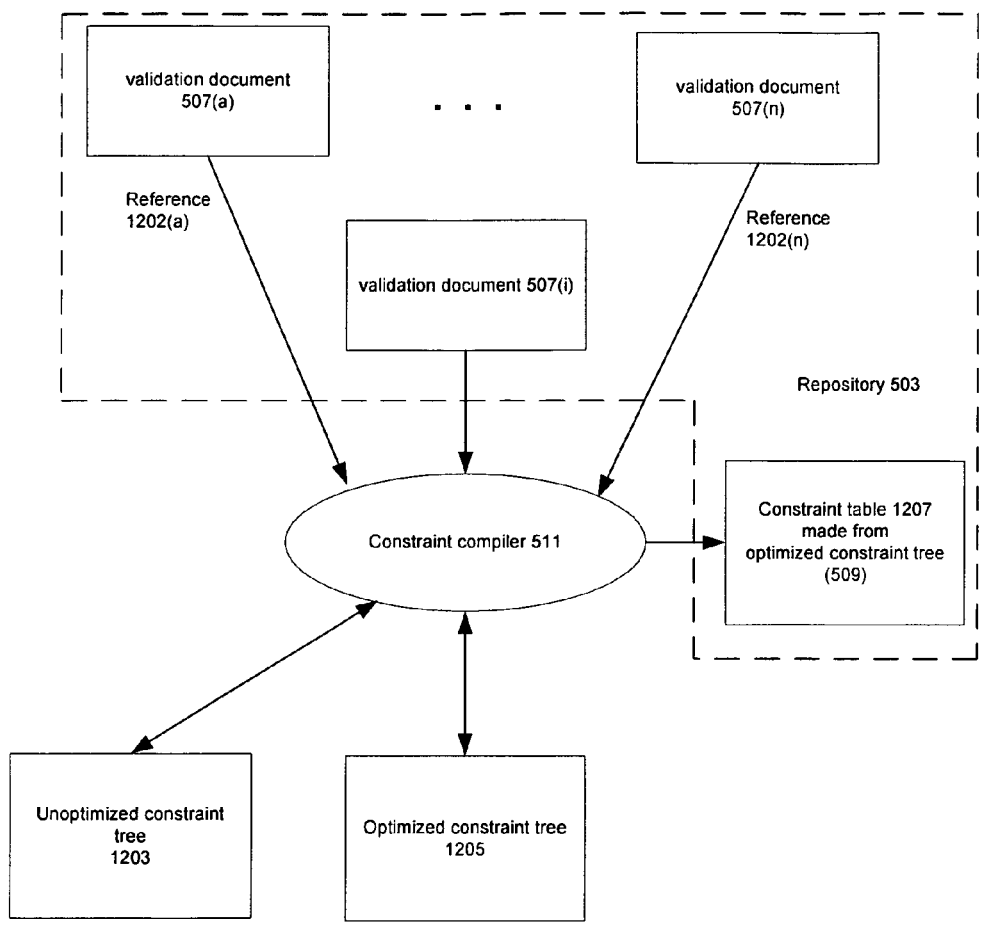
FIG. 12 is a detailed diagram of the compilation of a rule by constraint compiler 511.

Compilation: FIG. 12

FIG. 12 is a block diagram 1201 showing compilation of a validation document 507(*i*) in a preferred embodiment. Validation document 507(*i*) is one of a set of validation documents in model repository 503. If validation document 507(*i*) has reference constructs such as include constructs 1005 or references to global rules or macros 1009, constraint compiler 511 reads other validation documents 507(*a . . . n*) as specified by the reference constructs, as shown at 1202.

Constraint compiler 511 is a two-pass optimizing compiler in a preferred embodiment. Optimizing compilers are well known in the relevant arts. In its first pass, constraint compiler 511 parses and lexes validation document 507 and the constructs that are added to that document by the references 1202 to produce unoptimized constraint tree 1203, which is a tree of the operations specified by validation document 507 and references 1202. In its second pass, constraint compiler 511 optimizes unoptimized constraint tree 1203 to produce optimized constraint tree 1205. Optimized constraint tree 1205 is logically equivalent to unoptimized constraint tree 1203 but has been rearranged and pruned to increase the efficiency of constraint checks based on the optimized constraint tree. Constraint compiler 511 then makes a constraint table 1207 from the optimized constraint tree. Constraint table 1207 is a preferred embodiment of compiled representation 509. Constraint table 1207 is a relational database table whose entries are a serial representation of a depth-first traversal of optimized constraint table 1205. When DICOM validator 512 validates a DICOM document belonging to the class of DICOM documents for which validation document 507(*i*) was written, validator 512 interprets constraint table 1207. Constraint trees 1203 and 1205 exist in memory only during the compilation process; constraint table 1207 is stored in repository 503.

Figure 13:
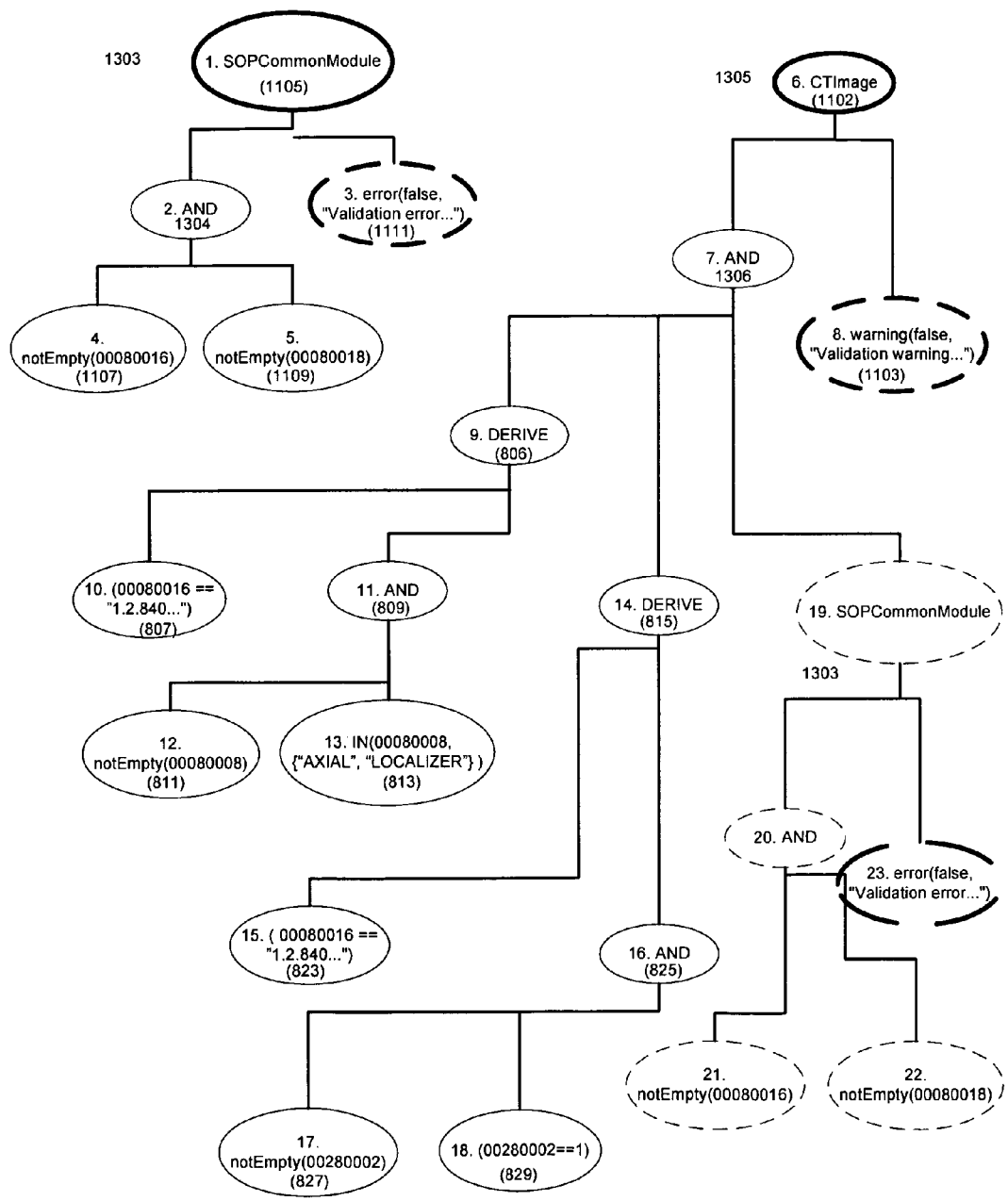
FIG. 13 shows the tree which compiler 511 makes from the example rule of FIG. 11 in the first pass.

Constraint Trees 1203 and 1205: FIGS. 12 and 13

Unoptimized constraint tree 1203 for validation document 1101 of FIG. 11 is shown in FIG. 13. There are two trees in FIG. 13. Each tree can be separately invoked to validate a portion of a DICOM object. The first tree, SOPCommonModule 1303, corresponds to global rule 1105 of FIG. 11. The second tree, CTimage 1305, corresponds to global rule 1102. The nodes of the tree are numbered. Each node of the tree represents a constraint from either rule 1102 or rule 1105; the numbers in parentheses are the numbers that indicate the constraints in FIGS. 8 and 11. Thus, node 4 of tree 1303 represents constraint 1107 of FIG. 11. 1304 in node 2 represents the constraint that is implied by the requirement of predicate 825 that all of the constraints in a rule evaluate to TRUE if the portion of the DICOM document to which the rule applies is valid. The same is the case for constraint 802 in node 7. Nodes whose outlines are heavy broken lines indicate action constructs. The action indicated by the node is taken on the basis of the result of its parent node in the tree. Note that node 19 and its children are a copy of node 1 and its children. This is the result of inline substitution of the rule SOPCommonModule into the rule ctImage. We use dotted lines to indicate that no extra storage is required for this part of the tree for the rule ctImage.

Figure 14:
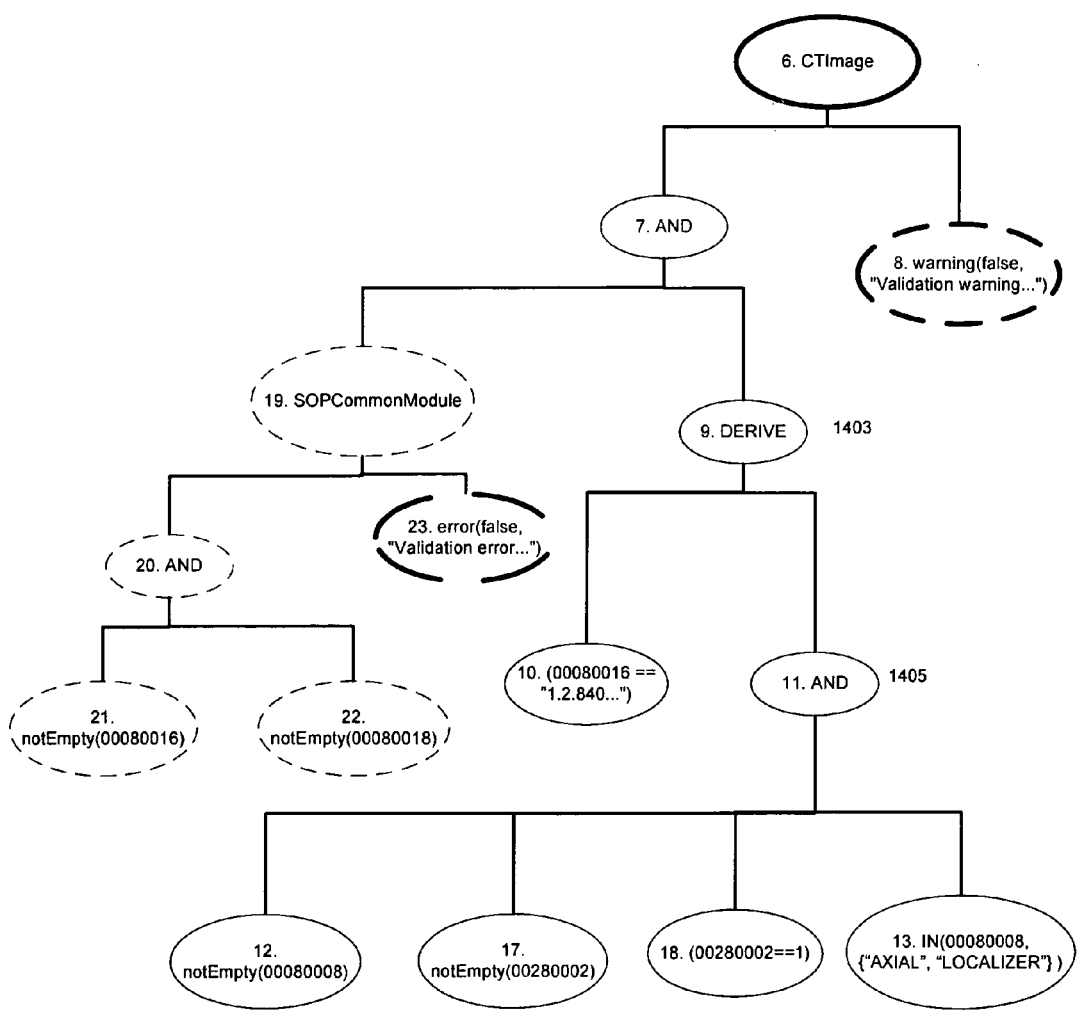
FIG. 14 shows an optimized tree which compiler 511 makes from the tree of FIG. 13.

FIG. 14 shows optimized constraint tree 1205. The nodes in optimized constraint tree 1205 have the same numbers they had in unoptimized constraint tree 1203. When constraint table 1207 is made from optimized constraint tree 1205, optimized constraint tree 1205 will be traversed from left to right and depth first. One of the optimizations of tree 1205 is based on the fact that the logical operation AND is false if any of its operands is false; consequently, the most efficient way to evaluate the operands of an AND operation is to evaluate the ones with the lowest computation cost first. In terms of tree traversal, that means that operands of an AND operation with lower computation costs need to be moved to the left in the tree. Compiler 511 has thus moved node 19 to be the left-most child of the node 7, because the constraint that is represented by the rule of node 19 is less expensive to compute than the constraint that is represented by node 9. The rule of node 19 also contains action node 23. Action node 23 throws an error when this subtree evaluates to false and that in turn ends evaluation of tree 1205. Note that the compiler has collapsed nodes 9 and 14 of FIG. 13 into one node 9 (1403), because the derive operations represented by that node have identical predicates 807 and 823 as their first operands. The compiler has similarly merged nodes 11 and 16 into a single node 11 because the second operand of the derive operation is the AND of the constraints represented by nodes 12, 13, 17, and 18. The compiler has also reordered the children of node 1405 such that the less computationally expensive nodes are to the left with respect to the data structure.

Compiler 511 can also use the information about in-memory DICOM representation 405 contained in data dictionary 411 to optimize tree 1205. For example, data dictionary 411 may contain access cost information about the nodes of in-memory DICOM representation 405. The access cost information may be used together with the computation cost of the operation being performed by a node of optimized tree 1205 to order the children of a given node of optimized tree 1205. For example, nodes 12 and 17 of tree 1205 have the same computation cost; if node 12 has a lower access cost, tree 1205 should be ordered such that node 12 is applied to in memory DICOM representation 405 before node 17.

Constraint Table 1207: FIG. 15

FIG. 15 shows constraint table 1207 which compiler 511 has made from optimized constraint tree 1205. Constraint table 1207 has a row 1503 for each node of optimized constraint tree 1205. The fields of each row include ID field 1505, which is an integer indicating the position of the row in the table, node number 1506, which is the node number represented by the row in optimized tree 1205, ACT 1507, which is the operation performed by the node, rows 1509-1515, which indicate parameters for the operation, In rows 1,2,6-10, which specify validations of constraints on nodes identified by DICOM tags, the first parameter specifies a locator by which the node may be located in memory representation 405. Locators will be explained in detail below. The fields of a row further include fields 1515 and 1517, which specify branches to other rows depending on the results of the evaluation. The branches permit the evaluation of a constraint to be shortened when certain conditions arise. For example, when either node 21 or node 22 evaluates to false, the branches in lines 1 and 2 of constraint table 1207 transfer evaluation of constraint table 1207 to the error action in line 5. The operations in ACT column 1507 are those specified in the nodes of optimized constraint tree 1205, except that ASSIGN is the operation which assigns a value to the node representing a global rule. The order of the rows in table 1207 is that produced by a left-to-right depth-first traversal of the tree. The traversal begins by evaluating the deepest leftmost node, i.e., node 21; then it evaluates node 22; then node 20, then node 19, whose ACT column in constraint table 1207 specifies an ASSIGN operation and then node 23, whose action is executed if node 19 evaluated to FALSE. Evaluation continues at node 10 and then goes to nodes 12, 17, 18, and 13, node 11, node 9, node 7, node 6 (an ASSIGN operation again), and then node 8, whose action is executed if node 6 evaluates to FALSE. An example of how DICOM validator 512 interprets table 1207 will be given below.

Also shown in FIG. 15 is global rule table 1519, which specifies the portions of constraint table 1207 which correspond to the global rules that it contains, namely SOPCommonModule and ctImage. There is a row 1521 for each rule and each row has a field for the rule's name, the row at which the rule starts (1525), the row at which it ends (1527), and the row that represents the node that returns the results of the rule. Note that in constraint table 1207, the rule ctImage contains the rule SOPCommonModule, and consequently, both SOPCommonModule and ctImage have the same start OP, namely 1, but differing end OPs. Validator 512 uses Global rule table 1519 to locate rules by name in constraint table 1207. In a presently-preferred embodiment, there is a single constraint table 1207 for the constraints specified by all of the rules and macros in the repository. In other embodiments, the constraint table 1207 and global rule table 1519 may be combined into single table or the constraint table 1207 may be split into multiple tables by partitioning it horizontal or vertically. The two tables may also be serialized into a file or other storage structure. The two tables may use other optimization techniques in addition to the on True or on False columns or may be shortened by the removal of optimization features.

Figure 16:
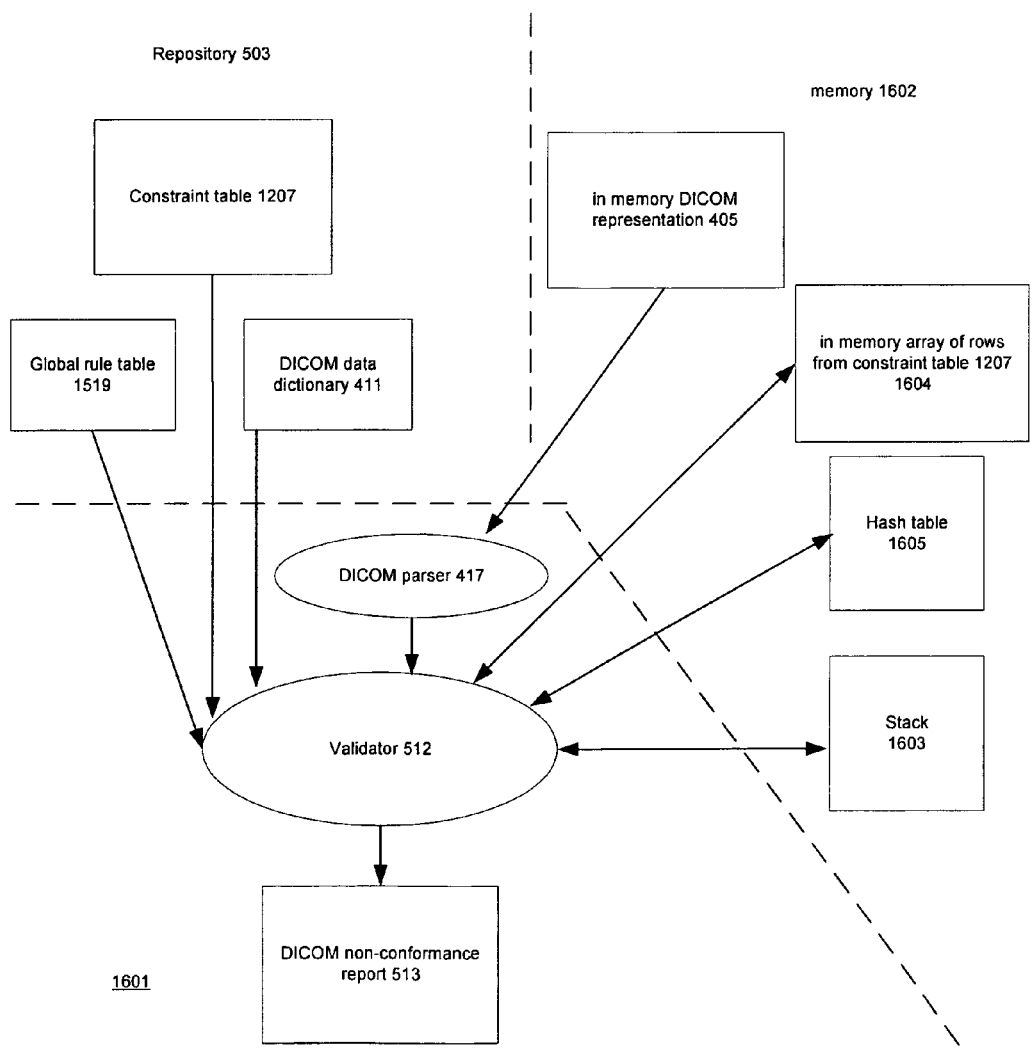
FIG. 16 is a detailed diagram of the execution of a rule by validator 512.

Validation of a DICOM Object: FIG. 16

FIG. 16 is a functional block diagram of validation 1601 of a DICOM object by validator 512. The inputs to validator 512 are from in memory representation 405 of the DICOM object via DICOM parser 417, constraint table 1207 containing the rules that apply to the DICOM object, DICOM data dictionary 411, and global rule table 1519, which validator 512 uses to locate rules by name in constraint table 1207. Validator 512 first uses global rule table 1519 to locate the rule to be applied to the DICOM object in constraint table 1207 and then makes a copy 1604 of the rows for the rule in memory 1602. Memory 1602 also contains in memory DICOM representation 405, stack 1603, and hash table 1605. Validator 512 maintains stack 1603 for holding the results of operations that will be used in subsequent operations and hash table 1605 for holding values that need to be accessible throughout the validation operation. Validator 512 outputs the results of the evaluation, including messages generated by any actions, to DICOM non-conformance report 513.

Validator 512 uses DICOM parser 417 to get the information it needs to determine whether the in-memory representation 405 of DICOM object satisfies the constraint. As mentioned above, parser 417 can retrieve the value of an attribute belonging to a DICOM object when the parser is given a locator for the DICOM object. The validator first uses the locator to obtain the data type for the attribute from DICOM data dictionary 411 and then provides the locator to DICOM parser 417.

In a preferred embodiment, the locator is an instance of the DICOM value locator type. The type specifies a particular DICOM attribute by "xxxxxxxx(definer)", where "xxxxxxxx" is the DICOM attribute tag and "definer" is the attribute definer, which can be from the DICOM standard (DICOM) or in the case of non-standard attributes, from other private sources. "xxxxxxxx(definer)" is termed the attribute's locator path. A locator path can also identify a particular descendent of an attribute that may contain other attributes. Such attributes are termed container type attributes. Sequence attributes are examples of container type attribute. The n-th item of a sequence attribute is denoted by "xxxxxxxx(definer)[n]#modifier". By default, the definer suffix "(definer)" can be omitted if the attribute is a DICOM standard tag. The index "n" of an item address "[n]" must be a positive integer. The item address suffix can be omitted if the item it pointed to is the first item of a sequence. The modifier field is useful to access a component of an attribute or to transform an attribute. For example, it may contain the member function cardinality, which returns the number of children in an actual instance for the attribute identified by tag xxxxxxxx. To give an example of a locator pathname, 00080096.00401101.00080100 is the pathname of DICOM tags that identifies the first referring physician. When this code is used in an instance of a DICOM value locator, the instance of the locator looks like this: 00080096(DICOM)[1].00401101(DICOM)[1].00080100(DICOM). The (DICOM) indicates the definer of the tag and the [1] indicates the first child of the parent attribute. The value at this location is of course the identification for the first referring physician.

Details of Validator 512: FIG. 17

FIG. 17 is pseudocode 1701 for an implementation of validator 512. As shown at 1703, the function evaluateConstraint 1701 takes the name of a rule and a reference to the DICOM object being validated as arguments and returns the result of the validation, as indicated at 1715. evaluateConstraint 1701 traverses the selected rules in constraint rule table 1207 (2-4) and uses parser 417 to perform the operations required by the rules on the relevant objects in in-memory DICOM representation 405, as shown at lines 7,10 and 13.) At 1705, function 1701 uses global rule table 1519 to locate the rule in constraint table 1207. At 1707, it fetches the rows for the rule named in the invocation from constraint table 1207 and puts them in array 1604 in memory. foreach loop 1709 evaluates each row of array 1604 in turn. The body of loop 1709 consists of switch statement 1711 and a stack push statement 1715. switch statement 1711 contains a case statement for each validation operation that can be performed on a DICOM object and for each of the actions that can result. For each row 1503 of the rule, validator 512 executes the case specified by the row's ACT field 1507 on the specified node of the in memory representation and pushes the number of the row and the result of the execution onto the stack 1603 (1715). When all of the rows have been processed in this fashion, validator 512 uses the number of the row that contains the result of the application of the rule (specified at 1529 in global rule table 1519) to get the result of the validation from stack 1603.

For example, if the operation is "notEmpty" (line 6), validator 512 invokes an object function attrNotEmpty(attributeTag) on the DICOM object (line 7) to verify that the attribute identified by the given attribute tag is empty in the given DICOM object. If the attribute is empty, the function returns false, otherwise the function returns true. The result of this function is saved in the local variable pred_val and is later pushed onto stack 1603 (line 42).

If the operation is "ASSIGN" (line 15), validator 512 fetches a predicate value from the stack (line 16) and saves it in hash table 1506 (line 17) so that it may be randomly accessed by other operations in case statement 1711.

If the operation is "ERROR" (line 30), validator 512 fetches the value of the row representing the parent of the error row from hash table 1605 (line 31) and then checks (line 32) whether it should throw an error message (line 33)

and abort the validation. After all operations have been evaluated without an error being thrown, validator 512 returns the constraint validation result 1717 (line 44).

Example Execution of Validator 512: FIG. 18

FIG. 18 shows a portion 1801 of the metadata from a DICOM object dcm1 and a trace 1811 of the execution of the function evaluateConstraint on portion 1801. The metadata is represented as a table with a row 1803 for each attribute. The row contains the attribute's name at 1805, its tag at 1807, and its value at 1809. Portion 1801 contains attributes that are evaluated by the rule ctImage 801. The attribute Samples per Pixel has a bad attribute value, since constraint 908 requires that the value of the attribute whose tag is 00280002 be 1.

Trace 1811 is a table, with each row of the table showing the results of the execution of one line of constraint operation table 1207 by for each loop 1711. The fields of the row are OperationID 1815, the number of the row in table 1207 that is being executed, the value returned by execution of the row, Stack 1819, which shows the contents of stack 1603 after execution of the row, and HashTable 1821, which shows the contents of the hash table after execution of the row.

Validator 512 first uses the case notEmpty to evaluate lines 1 and 2. Both evaluate to TRUE, since the attributes 00080008 and 00080016 are not empty for the given DICOM object dcm1. The results of both operations are on stack 1603. The operation for line 3 is AND, which pops the results of the preceding operations from the stack and returns TRUE if the AND of the results is true. The result is TRUE in this case and that value is pushed back onto the stack. Operation 4, which is an ASSIGN, pops the value at the top of the stack and stores it into hash table 1605. Operation 5, which is an error action, checks whether validator 512 should throw an error. However, since all predicates of SOPCommonModule evaluate to true, a NOP is performed. Similarly, operations 6 through 8 evaluate to true. Operation 9 checks if the value of attribute 00280002 is 1 for the DICOM object dcm1. In this case, it is not, so that attribute has a false predicate value. As a result, operations 11 through 14 also evaluate to false. Finally, we check if we should record a warning message. In this case, we do, because this CT image has an invalid attribute value (00280002=2). Finally, validator 512 returns the result (returnID is 14) of "CTImage" validation rule, which is false (14,F). Because validator 512's ASSIGN operation saves the value returned by the ASSIGN operation in hash table 1605, hash table 1605 contains the results for all global modules, and we know that the result (returnID is 4) of SOPCommonModule is TRUE for the DICOM object dcm1.

DICOM Attributes that have Children

In the above examples, the DICOM object and the constraint rules constrain only attributes that do not themselves have children. An example of a DICOM attribute that does have children is the code sequence attribute which the macro of FIG. 7 is used to validate. For example, the DICOM attribute referring physician identification sequence (00080096) can have a child attribute, person identification code sequence (0040110), which in turn can have a child attribute, code value (00080100). So the predicate "notEmpty(00080096.00401101.00080100)" evaluates to true if a DICOM object's referring physician identification code value is not empty. Such a predicate can be inserted into the above example with no change to the implementation of validator 512. When an attribute may have more than one child, the locator parameter for the row in the constraint table that corresponds to the constraint on the children includes the cardinality function that was previously explained and validator 512 applies the constraint to each of the child attributes. The parent attribute satisfies its constraint only if all the child attributes satisfy the constraint specified in the row for the children's constraint.

Indeed, the only limitation on the kinds of queries that may be supported by a constraint is whether in memory representation 405 of the DICOM object and an API associated with it such as the one provided by DICOM parser 417 permit the query to be performed with reasonable efficiency. In a preferred embodiment, in memory representation 405 is a tree representation and DICOM parser 427 provides for efficient hierarchical navigation of the tree. If the DICOM object is managed in-memory as a flat list, indexes may permit rapid access. Another possibility is to implement the in memory representation as a hash table of attributes. With attributes that have children, the entry reached via the hash table for the parent attribute is a hash table of the child attributes. The hash table of attributes is efficient for accessing DICOM objects which have a spread-out shallow tree structures.

Because the constraint language used in validation document 507 is declarative rather than procedural, the language is indifferent to the way in which validation is actually performed. Validation as just described is instruction-flow driven, i.e., an operation specified in a line of compiled representation 509 is applied to the relevant objects of in memory DICOM representation. Implementations that employ what is termed a data-flow driven implementation do the reverse: the validator traverses the DICOM object and for each node, find the rule that applies to it in the constraint table and apply the rule to the node.

Using Rules and Macros to Query DICOM Objects

A rule responds either positively or negatively to each structure of a DICOM object to which the rule applies. Rules can thus be used to directly query the structures in a DICOM object. A simple way of doing this in a preferred embodiment is by including a log action in a rule that outputs information about each DICOM structure to which the rule was applied. The technique could be used positively, to find all of the valid examples of the structure in the DICOM object, or negatively, to find all of the invalid examples of the structure.

Conclusion

The foregoing Detailed Description has described to those skilled in the relevant technologies how to employ the techniques for validating digital objects disclosed herein and has further disclosed the best mode presently known to the inventors for employing the techniques. It will, however, be immediately apparent to those skilled in the relevant technologies that many other implementations of the techniques may be made which employ the principles disclosed herein. For example, the validation techniques as disclosed herein are implemented in a preexisting system for integrating DICOM objects into a database system and employ preexisting components of the system for integrating DICOM objects such as the DICOM data dictionary, the DICOM parser, and in memory DICOM representation 405. In other embodiments, the parser may be a component of the validator and the data dictionary may be a component of the compiler. Indeed, in some embodiments, the compiler and the data dictionary may be components of the validator.

The fact that the validation document and the constraint specifiers are declarative makes them particularly useful, as do the fact that constraint specifiers may be nested and the fact that components of the validation document may be referred to by name or may be parameterized. The particular syntax used in the embodiment disclosed herein is, however, a matter of designer's choice. The particular techniques used to optimize the compiled validation document are also a matter of designer's choice, as are the techniques used to optimize access to the in memory representation. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. Apparatus for validating a digital object with identifiable subobjects, the digital object being subject to constraints concerning structure or content of the identifiable subobjects, the apparatus being implemented in a processor and data storage accessible to the processor and the apparatus comprising:
   a representation of the digital object in one or more data storage devices;
   a constraint table and a global rule table;
   a validation specification that specifies technology-neutral constraints to which the digital object is subject, wherein the technology-neutral constraints are specified in respective predicates of a list of rules in the validation specification, the list of rules is stored in the global rule table, and the technology-neutral constraints are stored in the constraint table and specified in a declarative constraint language format instead of specific technology formats including eXtensible Markup Language (XML) format;
   an executable compiler in the one or more data storage device that, when executed by the processor, produces a compiled validation specification that is an optimized version of the validation specification; and
   an executable validator module in the one or more data storage devices that, when executed by the processor, validates the digital object without representing the digital object as an XML document, and the executable validator module is further configured to:
      identify a rule from the global rule table by using a name of the rule;
      create a copy of one or more rows for the rule in the global rule table into the one or more data storage devices;
      apply the rule to the representation of the digital object to generate validation results comprising a result of applying a predicate in the rule to the representation of the digital object;
      store the validation results in the one or more data storage devices, wherein the validation results are used in one or more subsequent processes; and
      maintain the result of applying the predicate to the representation to be accessible throughout validating the digital object by storing the result in a hash table.

2. The apparatus set forth in claim 1 wherein
   the validation specification is written in a declarative constraint language;
   a technology-neutral constraint of the technology-neutral constraints is defined in terms of one or more other technology-neutral constraints and
   the declarative constraint language comprises a specification of the technology-neutral constraint which includes one or more specifications of the one or more other technology-neutral constraints.

3. The apparatus set forth in claim 2 wherein:
   when the specification of a technology-neutral constraint includes the one or more specifications of the one or more other constraints, a value to which the technology-neutral constraint evaluates is determined by one or more values to which the one or more other technology-neutral constraints evaluate.

4. The apparatus set forth in claim 3 wherein:
   a constraint specification evaluates to a value indicating a Boolean value TRUE or to a value indicating a Boolean value FALSE.

5. The apparatus set forth in claim 4 wherein:
   the one or more other technology-neutral constraints are operands of a Boolean operation whose evaluation determines the value of the technology-neutral constraint.

6. The apparatus set forth in claim 2 wherein:
   the specification of the technology-neutral constraint is parameterized.

7. The apparatus set forth in claim 2 wherein:
   the specification of the technology-neutral constraint is named and is referred to by a name of the technology-neutral constraint in the validation specification.

8. The apparatus set forth in claim 1 wherein:
   a specification of a technology-neutral constraint includes an action specifier which specifies an action whose performance depends on a result of an evaluation.

9. The apparatus set forth in claim 8 wherein:
   the action is terminating the evaluation.

10. The apparatus set forth in claim 8 wherein:
    the action is providing an intermediate result of the evaluation.

11. The apparatus set forth in claim 1 wherein:
    the compiler optimizes the compiled validation specification with regard to a cost of evaluating the technology-neutral constraints.

12. The apparatus set forth in claim 11 wherein:
    the cost of evaluating the technology-neutral constraints includes a first cost of applying the technology-neutral constraints to the digital object.

13. The apparatus set forth in claim 12 further comprising:
    a data dictionary for the digital object, the data dictionary responding when the compiler provides a locator for a subobject by providing a cost of accessing a value in the subobject.

14. The apparatus set forth in claim 1 wherein the apparatus further comprises:
    an optimized representation of the digital object that provides a rapid access to identifiable subobjects therein, the validator performing an evaluation using the compiled validation specification and the optimized representation of the digital object.

15. The apparatus set forth in claim 14 further comprising:
    a parser for the optimized representation of the digital object, the parser responding when the validator module provides a locator for an identifiable subobject and a data type for a value in the identifiable subobject by returning the value from the optimized representation.

16. The apparatus set forth in claim 15 further comprising:
    a data dictionary for the digital object, the data dictionary responding when the validator provides the locator for the identifiable subobject by providing the data type for the value in the identifiable subobject.

17. The apparatus set forth in claim 16 wherein:
    the one or more data storage devices further include a database system, and the digital object is stored in the database system.

18. The apparatus set forth in claim 16 wherein:
the data dictionary, the validation specification, and the compiled validation specification belong to a model for a class of the digital objects stored in a database system.

19. The apparatus set forth in claim 14 wherein:
the one or more data storage devices that include the optimized representation of the digital object and the compiled validation specification is memory local to the processor.

20. The apparatus set forth in claim 1 wherein:
the digital object is a DICOM object.

21. A method of validating a digital object with identifiable subobjects, the digital object being subject to constraints concerning structure and/or content of the subobjects, the method being performed in a processor that has access to data storage, and the method comprising:
 loading a representation of the digital object into one or more data storage devices;
 identifying a constraint table and a global rule table;
 obtaining a validation specification that specifies technology-neutral constraints to which the digital object is subject, wherein the technology-neutral constraints are specified in respective predicates of a list of rules in the validation specification, the list of rules is stored in the global rule table, and the technology-neutral constraints are stored in the constraint table and specified in a declarative constraint language format instead of specific technology formats including eXtensible Markup Language (XML) format;
 compiling the validation specification into a compiled validation specification; and
 validating, at a validator module, the digital object without representing the digital object as an XML document, wherein validating the digital object at the validator module further comprises:
  identifying, at the validator module, a rule from the global rule table by using a name of the rule;
  creating a copy of one or more rows for the rule in the global rule table into the one or more data storage devices;
  applying the rule to the representation of the digital object to generate validation results comprising a result of applying a predicate in the rule to the representation of the digital object;
  storing the validation results in the one or more data storage devices, wherein the validation results are used in one or more subsequent processes; and
  maintaining the result of applying the predicate to the representation to be accessible throughout validating the digital object by storing the result in a hash table.

22. The method set forth in claim 21 wherein
the validation specification is written in the declarative constraint language format;
a technology-neutral constraint of the technology-neutral constraints is defined in terms of other technology-neutral constraints, and a declarative constraint language comprises a specification of the technology-neutral constraint which includes specifications of the other technology-neutral constraints.

23. The method set forth in claim 22 wherein:
the specification of the technology-neutral constraint is parameterized.

24. The method set forth in claim 22 wherein:
the specification of the technology-neutral constraint is named and is referred to by a name of the technology-neutral constraint so that the technology-neutral constraint is characterized by being capable of being reused by multiple validation specifications.

25. The method set forth in claim 21 wherein
a specification of a technology-neutral constraint includes an action specifier which specifies an action whose performance depends on a result of an evaluation and the evaluation-includes performing the action.

26. The method set forth in claim 21 wherein compiling the validation specification includes:
 optimizing the compiled validation specification with regard to a cost of evaluating the technology-neutral constraints.

27. The method set forth in claim 26 wherein:
the cost of evaluating the technology-neutral constraints includes a first cost of applying the technology-neutral constraints to the representation of the digital object.

28. The method set forth in claim 27 wherein
the one or more data storage devices include a data dictionary for the digital object, the data dictionary responding when the compiler provides a locator for a subobject by providing a second cost of accessing a value in the subobject and optimizing the compiled validation includes:
 using the data dictionary to determine the first cost of applying the technology-neutral constraint to the representation of the digital object.

29. The method set forth in claim 26, further comprising:
making an optimized representation of the digital object in the one or more data storage devices, the optimized representation providing a rapid access to the subobjects therein and evaluating the technology-neutral constraints being done using the optimized representation.

30. The method set forth in claim 21, further comprising
identifying, at the validator module, the rule referenced in the validation specification using the global rule table and a globally accessible rule identifier for the rule, wherein the rule is globally accessible by a plurality of validation specifications by referencing the globally accessible rule identifier;
identifying, at the validator module, a macro referenced in the validation specification from a macro table and a globally accessible macro identifier for the macro, wherein the macro is globally accessible by the plurality of validation specifications by referencing the globally accessible macro identifier;
identifying the predicate that is included in the rule and a locally accessible predicate identifier for the predicate, wherein the predicate is only accessible within the validation specification by referencing the locally accessible predicate identifier but not from one or more other validation specifications;
identifying a first technology-neutral constraint that is specified in the predicate from the technology-neutral constraints and a constraint identifier that is referenced in the validation specification;
maintaining, at a compiler that compiles the validation specification into the compiled validation specification, a list of identifiers and pathnames to at least the rule and the macro for the validation specification;
identifying a second technology-neutral constraint that is specified in the predicate from the constraint table and a technology-neutral constraint identifier for the technology-neutral constraint;
applying the second technology-neutral constraint to the representation of the digital object; and determining whether the representation of the digital object satisfies the second technology-neutral constraint.

31. A data storage device characterized in that:

the data storage device includes code which, when executed performs a set of acts that comprises:

loading a representation of the digital object into one or more data storage devices;

identifying a constraint table and a global rule table;

obtaining a validation specification that specifies technology-neutral constraints to which the digital object is subject, wherein the technology-neutral constraints are specified in respective predicates of a list of rules in the validation specification, the list of rules is stored in the global rule table, and the technology-neutral constraints are stored in the constraint table and specified in a declarative constraint language format instead of specific technology formats including eXtensible Markup Language (XML) format;

compiling the validation specification into a compiled validation specification; and validating, at a validator module, the digital object without representing the digital object as an XML document, wherein validating the digital object at the validator module further comprises:

identifying, at the validator module, a rule from the global rule table by using a name of the rule;

creating a copy of one or more rows for the rule in the global rule table into the one or more data storage devices;

applying the rule to the representation of the digital object to generate validation results comprising a result of applying a predicate in the rule to the representation of the digital object;

storing the validation results in the one or more data storage devices, wherein the validation results are used in one or more subsequent processes; and maintaining the result of applying the predicate to the representation to be accessible throughout validating the digital object by storing the result in a hash table.

* * * * *